US009915298B2

United States Patent
Heravi et al.

(10) Patent No.: US 9,915,298 B2
(45) Date of Patent: Mar. 13, 2018

(54) ELECTROMAGNETIC PULSE DISCONNECT SYSTEM AND METHODS

(71) Applicant: Warn Automotive, LLC, Milwaukie, OR (US)

(72) Inventors: Oliver Heravi, Beaverton, OR (US); Adrian Simula, Livonia, MI (US); Bryan Averill, Portland, OR (US)

(73) Assignee: Warn Automotive, LLC, Milwaukie, OR (US)

( * ) Notice: Subject to any disclaimer, the term of this patent is extended or adjusted under 35 U.S.C. 154(b) by 128 days.

(21) Appl. No.: 14/686,057

(22) Filed: Apr. 14, 2015

(65) Prior Publication Data

US 2015/0308519 A1  Oct. 29, 2015

Related U.S. Application Data

(60) Provisional application No. 61/983,388, filed on Apr. 23, 2014, provisional application No. 62/051,858, filed on Sep. 17, 2014.

(51) Int. Cl.
 *F16D 19/00* (2006.01)
 *F16D 27/118* (2006.01)
 (Continued)

(52) U.S. Cl.
 CPC .......... *F16D 27/118* (2013.01); *F16D 48/064* (2013.01); *F16D 11/14* (2013.01);
 (Continued)

(58) Field of Classification Search
 CPC ................. F16D 27/118; F16D 48/064; F16D 2500/10431; F16D 2500/70418;
 (Continued)

(56) References Cited

U.S. PATENT DOCUMENTS 3,084,776 A * 4/1963 Rabinow ................. F16D 11/14
 192/109 R
4,271,722 A 6/1981 Campbell
 (Continued)

FOREIGN PATENT DOCUMENTS

WO 2012145580 A1 10/2012

OTHER PUBLICATIONS

Heravi, O., "Electromagnetic Biased Torque Disconnect Actuator," U.S. Appl. No. 60/826,631, filed Sep. 22, 2006, 10 pages.
(Continued)

*Primary Examiner* — David J Hlavka
(74) *Attorney, Agent, or Firm* — McCoy Russell LLP

(57) ABSTRACT

Methods and systems are provided for operating an electromagnetic pulse disconnect assembly for selectively engaging two rotating components of a vehicle drivetrain. A disconnect assembly is needed that is not powered by vacuum diverted from an engine of the vehicle, as modern engines are being developed to reduce vacuum production and remove vacuum lines for powering peripheral devices such as disconnects. An electromagnetic pulse disconnect assembly is provided that operates via pulses of electrical current and includes an electromagnetic coil for translating a clutch ring assembly and a latching ring assembly to selectively couple two rotating components.

6 Claims, 20 Drawing Sheets

(51) Int. Cl.
*F16D 48/06* (2006.01)
*F16D 11/14* (2006.01)
*F16D 11/00* (2006.01)
*F16D 23/12* (2006.01)

(52) U.S. Cl.
CPC .. *F16D 2011/002* (2013.01); *F16D 2023/123* (2013.01); *F16D 2300/18* (2013.01); *F16D 2500/1022* (2013.01); *F16D 2500/10431* (2013.01); *F16D 2500/3026* (2013.01); *F16D 2500/70418* (2013.01)

(58) Field of Classification Search
CPC ............. F16D 2500/1022; F16D 11/14; F16D 2023/123; F16D 2011/002; F16D 2300/18
See application file for complete search history.

(56) References Cited

U.S. PATENT DOCUMENTS

| | | | |
|---|---|---|---|
| 4,340,133 A * | 7/1982 | Blersch | F16D 27/09 192/30 W |
| 4,811,824 A | 3/1989 | Kurihara | |
| 6,082,514 A | 7/2000 | Averill | |
| 7,793,767 B2 | 9/2010 | Heravi et al. | |
| 8,443,954 B2 | 5/2013 | Quehenberger et al. | |
| 8,584,785 B2 | 11/2013 | Marsh et al. | |
| 8,597,150 B1 | 12/2013 | Downs et al. | |
| 2005/0279601 A1 | 12/2005 | Tuday | |
| 2008/0058151 A1 | 3/2008 | Curtis | |
| 2010/0089685 A1 | 4/2010 | Quehenberger et al. | |
| 2012/0202636 A1 | 8/2012 | Perakes et al. | |
| 2014/0190781 A1 | 7/2014 | Lawson et al. | |
| 2015/0060222 A1 * | 3/2015 | Showalter | F16D 41/16 192/43.1 |
| 2015/0300418 A1 | 10/2015 | Averill et al. | |
| 2016/0017932 A1 | 1/2016 | Gilmore | |

OTHER PUBLICATIONS

"Eaton ELocker Differentials," JEGS Website, Available Online at www.jegs.com/p/Eaton/Eaton-ELocker-Differentials/1032956/10002/-1, Available as Early as Jun. 21, 2009, 3 pages.

"Air Lockers," ARB 4x4 Accessories Website, Available Online at http://store.arbusa.com/Air-Lockers-C7.aspx, Available as Early as Aug. 8, 2009, 3 pages.

ISA United States Patent and Trademark Office, International Search Report Issued in Application No. PCT/US2014/033989, dated Aug. 22, 2014, WIPO, 2 pages.

"Performance Differentials: Mar. 2016 Application Guide," Eaton Performance Products Catalog, Mar. 2016, 20 pages.

* cited by examiner

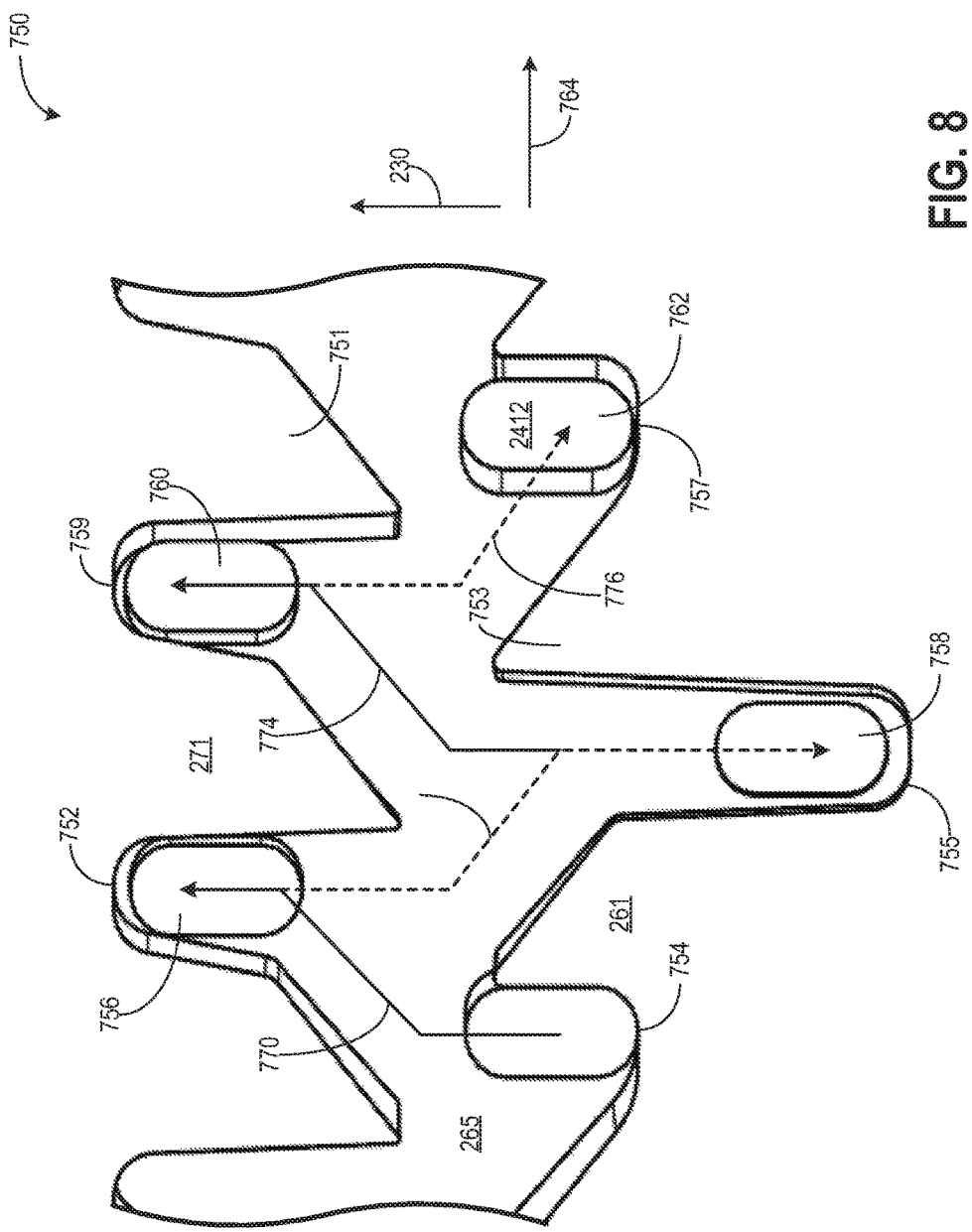

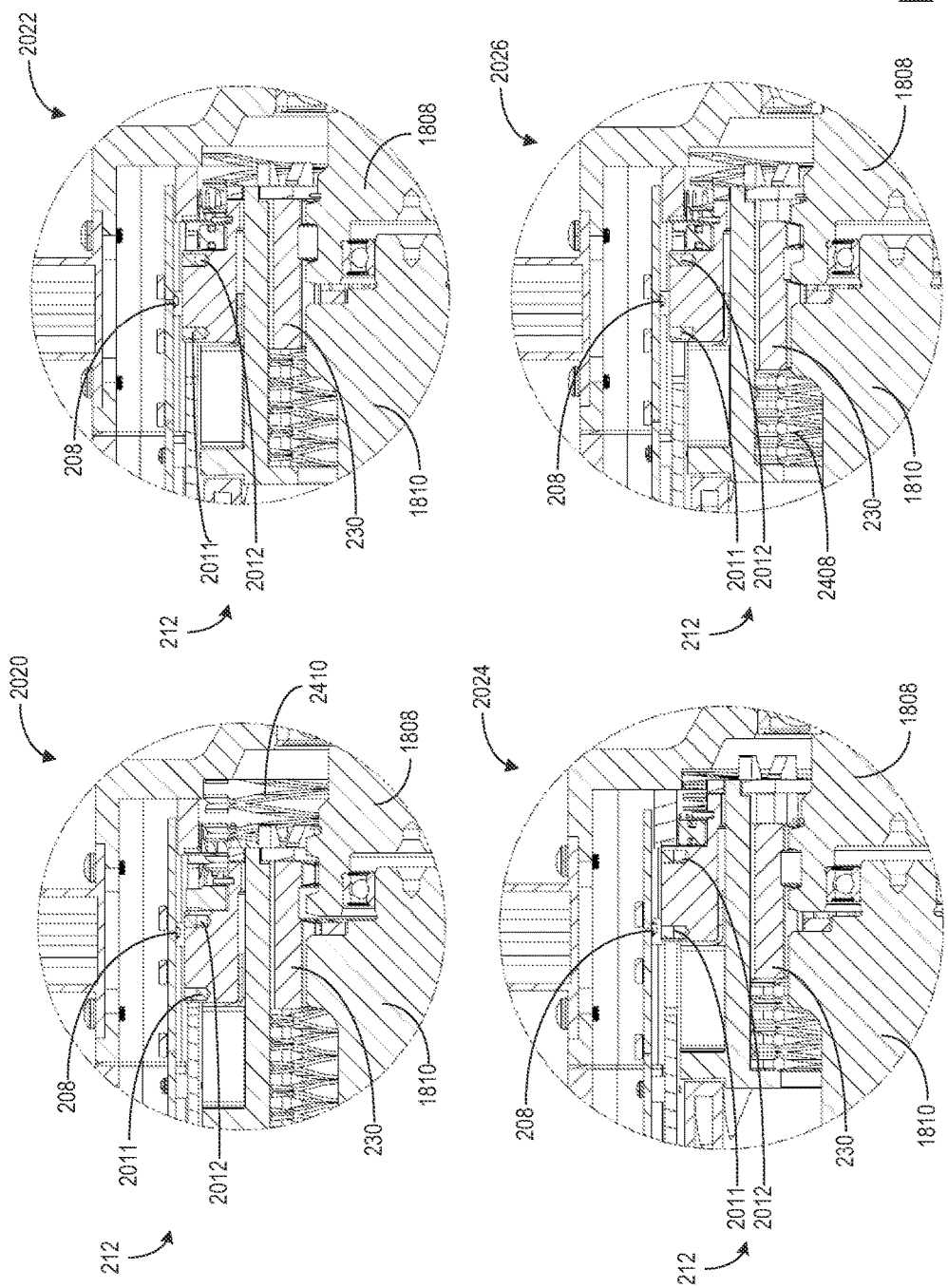

ELECTROMAGNETIC PULSE DISCONNECT SYSTEM AND METHODS

CROSS REFERENCE TO RELATED APPLICATIONS

The present application claims priority to U.S. Provisional Patent Application No. 61/983,388, "Electromagnetic Pulse Disconnect System and Methods," filed on Apr. 23, 2014, and U.S. Provisional Patent Application No. 62/051,858, "Electromagnetic Pulse Disconnect System and Methods," filed on Sep. 17, 2014, the entire contents of each of which are hereby incorporated by reference for all purposes.

FIELD

The present application relates generally to an electromagnetic pulse disconnect assembly and related system for engaging and disengaging two rotating components of a vehicle.

SUMMARY/BACKGROUND

Modern vehicles often incorporate one or more drivetrain modes for providing power from an engine to the driven wheels. For example, a vehicle with only a two-wheel drive system, or 4×2 mode, may provide power via one or a series of rotating shafts to two wheels of the vehicle. Vehicles such as compact cars may use a front wheel drive system with power provided to the two front wheels. In other, often larger vehicles, it is often desirable to incorporate both two-wheel drive and four-wheel drive driving modes, wherein power may be selectively distributed to two wheels in one mode and four wheels in another mode. Vehicles of different sizes often incorporate two-wheel drive of the rear wheels and four-wheel drive for the purpose of enabling better handling during varying traction conditions while still being able to switch to two-wheel drive to reduce fuel consumption and reduce wasted power.

For vehicles with switchable drive modes, devices and systems are needed for engaging and disengaging drivetrain components such as axles and shafts. As such, disconnect assemblies are used that often involve a form of clutch that can move to connect or disconnect two rotatable components such as two shafts. The disconnect assemblies can be placed in a variety of areas in the drivetrain of a vehicle, including at the wheel ends, at one or more axles, or along one of the drive shafts. Through the use of disconnect systems, vehicles can be made more versatile by having the ability to switch between different drive modes depending on the driving conditions and operator desire.

In some powertrain disconnecting systems, vacuum directed from the vehicle engine is used as the motive or actuating force that powers the disconnecting systems. In particular, the disconnecting system actuators may be powered by the vacuum. In many systems, the vacuum is directed via a passage from the intake manifold of the gasoline-fueled engine. Due to this, the vacuum level, or amount of force or pressure available from the vacuum, may vary as engine throttle settings change along with engine load. For many engine systems, the vacuum level (amount of pressure available) may be limited or vary due to the effects of altitude. Furthermore, temperature changes can also cause pressure fluctuations in the vacuum level, thereby causing fluctuations in movement of the disconnect actuator which may result in undesirable movement of disconnect components such as the diaphragm and clutch components. Additionally, in some vehicles vacuum may not be readily available since various vehicle accessory systems may not be powered by vacuum, or the vehicle may be designed to remove engine intake connections such as vacuum lines in order to enhance engine control and performance. Finally, vacuum-powered powertrain disconnect systems are becoming less desirable with more advanced vehicle design. As such, powertrain disconnect systems are needed that are powered by sources other than vacuum and feature designs conducive to modern vehicle systems. The inventors herein have recognized the above issues and developed various approaches to address them.

Thus in one example, the above issues associated with vacuum powered disconnects may be at least partially addressed by a method of operating a disconnect assembly of a shaft, comprising: driving a shifter mechanism from a first self-locking position to a second self-locking position via an electromagnetic coil generating an axial force through an armature cam assembly including a series of bi-directional ramps interfacing with axially extending guides of the shifter mechanism, the coil energized only during transitions between the first and second self-locking positions, the first and second self-locking positions including a shaft engaging position and a shaft disengaging position. In this way, a compact disconnect assembly is provided that is powered by discrete pulses of electrical current to an electromagnetic coil located in the disconnect assembly, while not relying on vacuum power. The electromagnetic coil may be designed to only come into contact with an armature of the disconnect assembly when the coil is energized or activated, thereby increasing the longevity of the contacting components.

The electromagnetic pulse disconnect assembly may also include a magnetic position sensor assembly to monitor the position of the moving components of the assembly that allow for switching between different driving modes, such as four-wheel drive and two-wheel drive. The sensor assembly may be configured to detect the strength of a magnetic field produced by a magnet located on a translating but non-rotating component of the disconnect assembly. Correlating the magnetic field strength with position of the disconnect assembly may allow for accurate monitoring of the shifting motions of the disconnect assembly. Furthermore, by using a magnetic sensor, a space may be maintained such that the sensor does not interfere with the movement of the disconnect assembly.

The proposed electromagnetic disconnect assembly may alleviate the issues associated with vacuum-powered disconnects. By providing pulses of current from a power source, the disconnect assembly may consume less power than other disconnects that provide continuous current to enable shifting and maintain shifting positions. The current pulses may energize the electromagnetic coil to slow down rotation of the armature, thereby causing a ramping ring to translate in an axial direction to move a clutch ring in the same direction. As explained later, this movement along with a biasing engagement spring force may cause coupling and decoupling between two rotating components, such as drive shafts and/or axles.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 8 shows a schematic of a latching track of the electromagnetic pulse disconnect assembly.

FIG. 20 shows an orientation of a position sensor assembly for different shift positions of a center electromagnetic disconnect.

DETAILED DESCRIPTION

Figure 1:
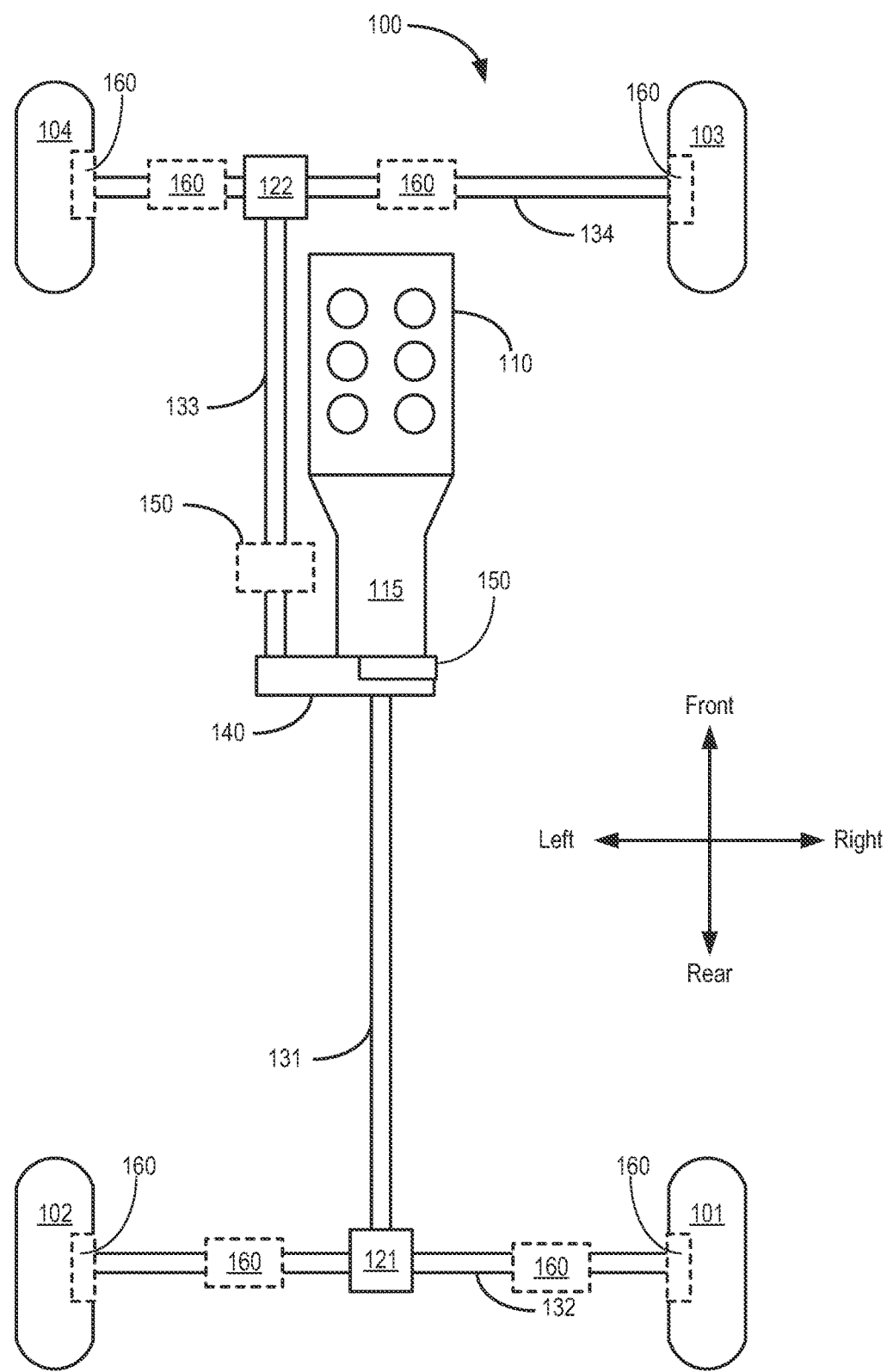
FIG. 1 shows a simplified powertrain of a vehicle in accordance with the present disclosure.
Figure 3:
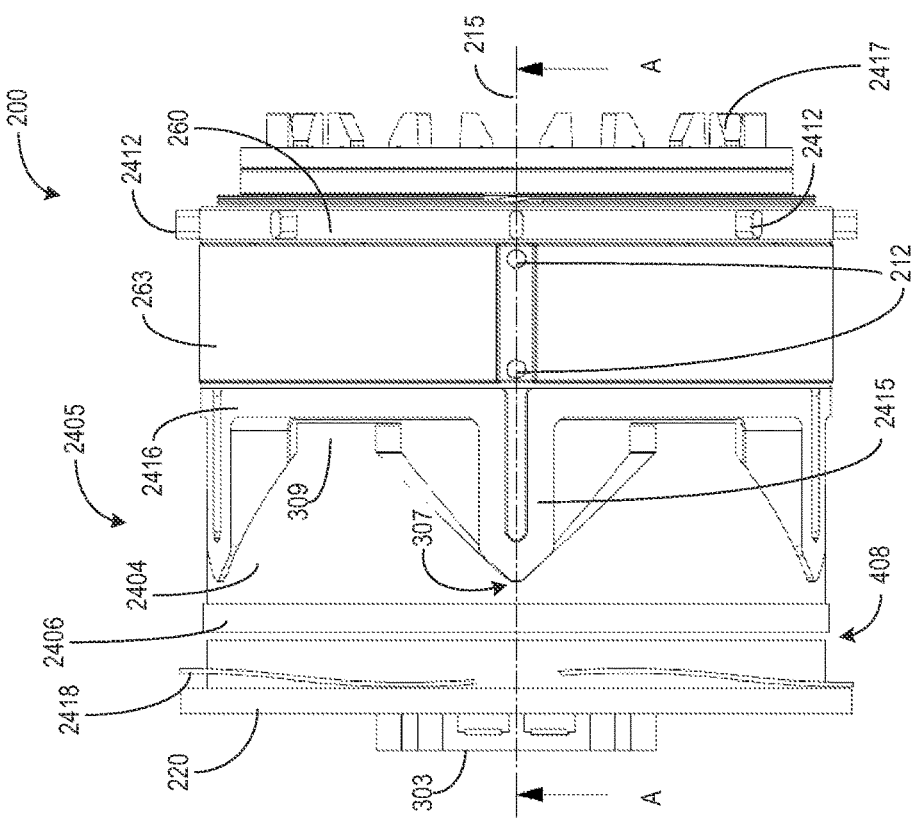
FIG. 3 shows an assembled view of the electromagnetic pulse disconnect assembly.
Figure 2:
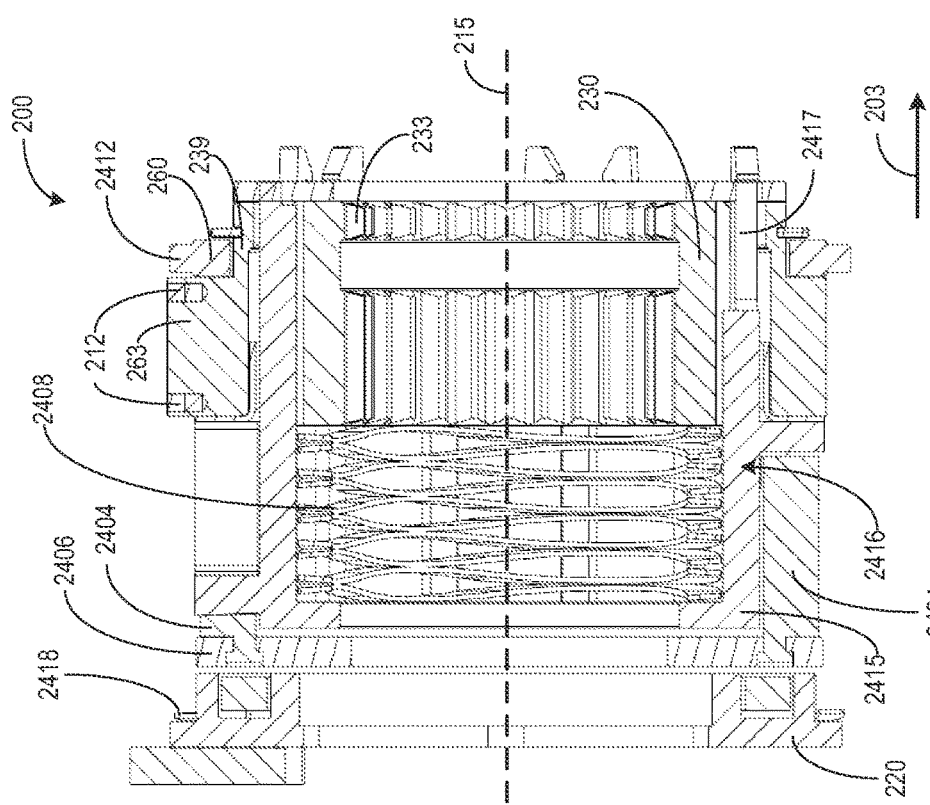
FIG. 2 shows a cross-section of an assembled view of an electromagnetic pulse disconnect assembly.
Figure 4:
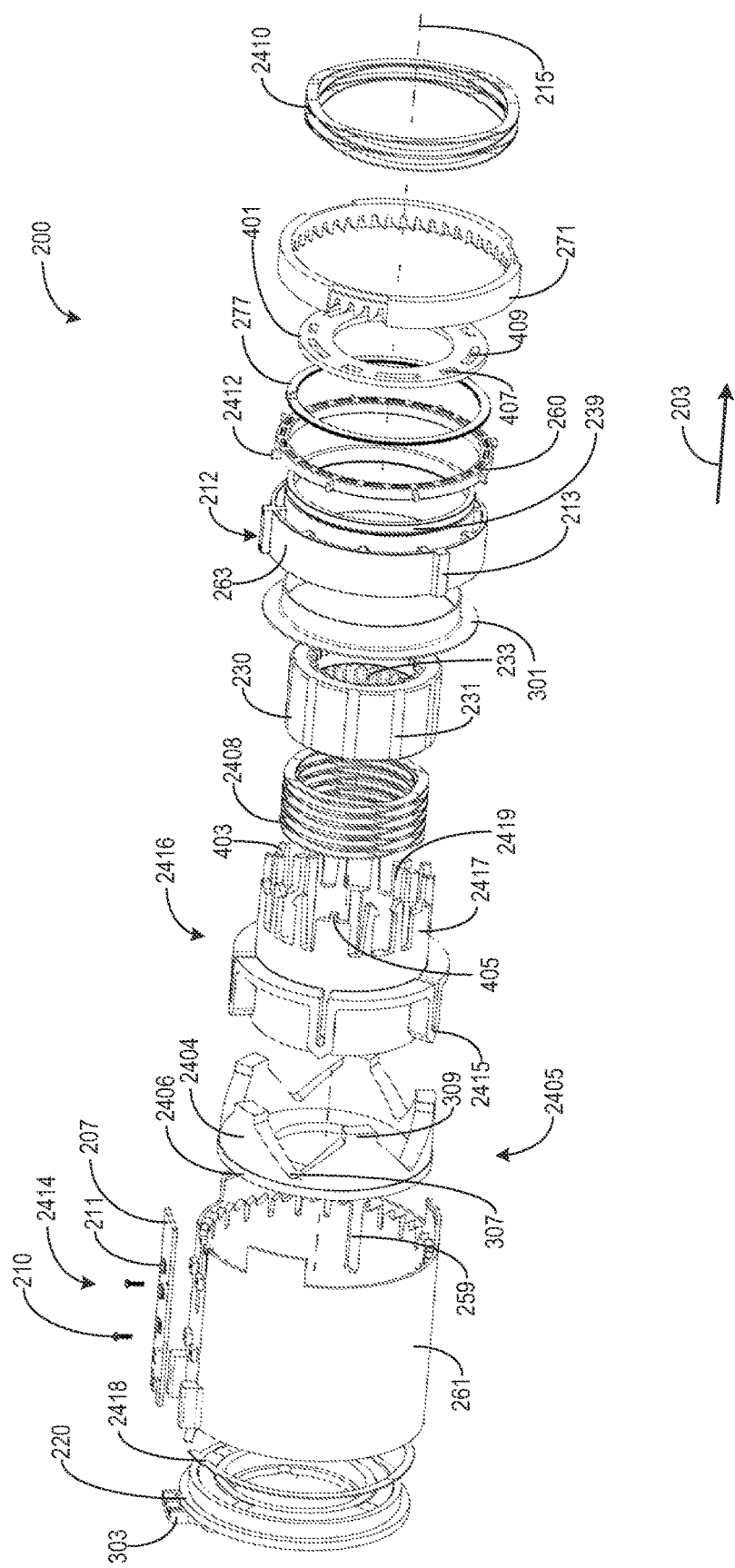
FIG. 4 shows an exploded view of the electromagnetic pulse disconnect assembly.
Figure 7:
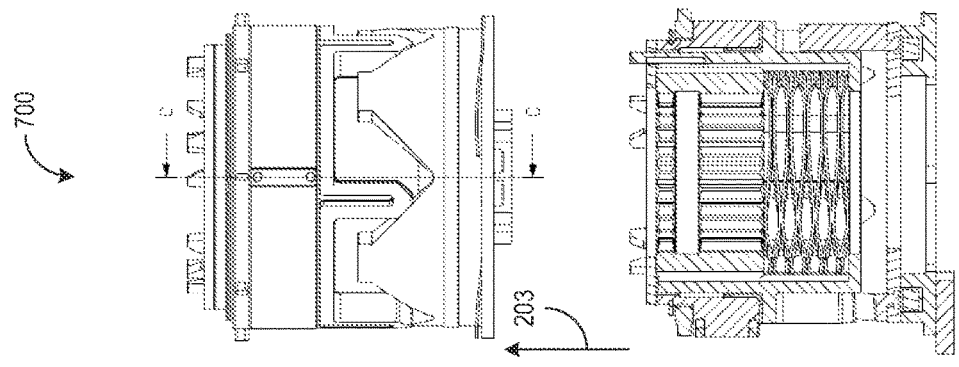
FIG. 7 shows views of the electromagnetic pulse disconnect assembly while in a 4×4 position.
Figure 6:
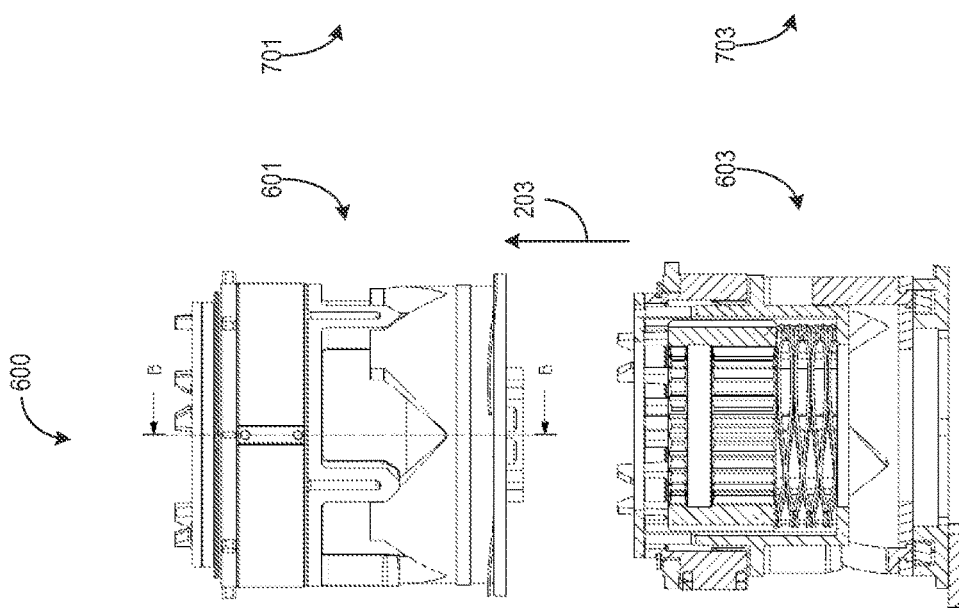
FIG. 6 shows views of the electromagnetic pulse disconnect assembly while in an end of shift position.
Figure 5:
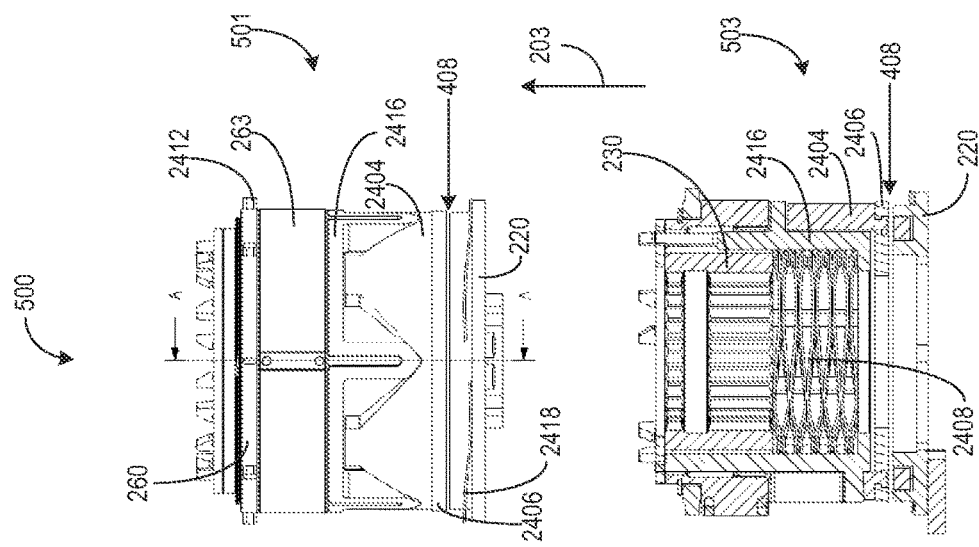
FIG. 5 shows views of the electromagnetic pulse disconnect assembly while in a 4×2 position.
Figure 9:
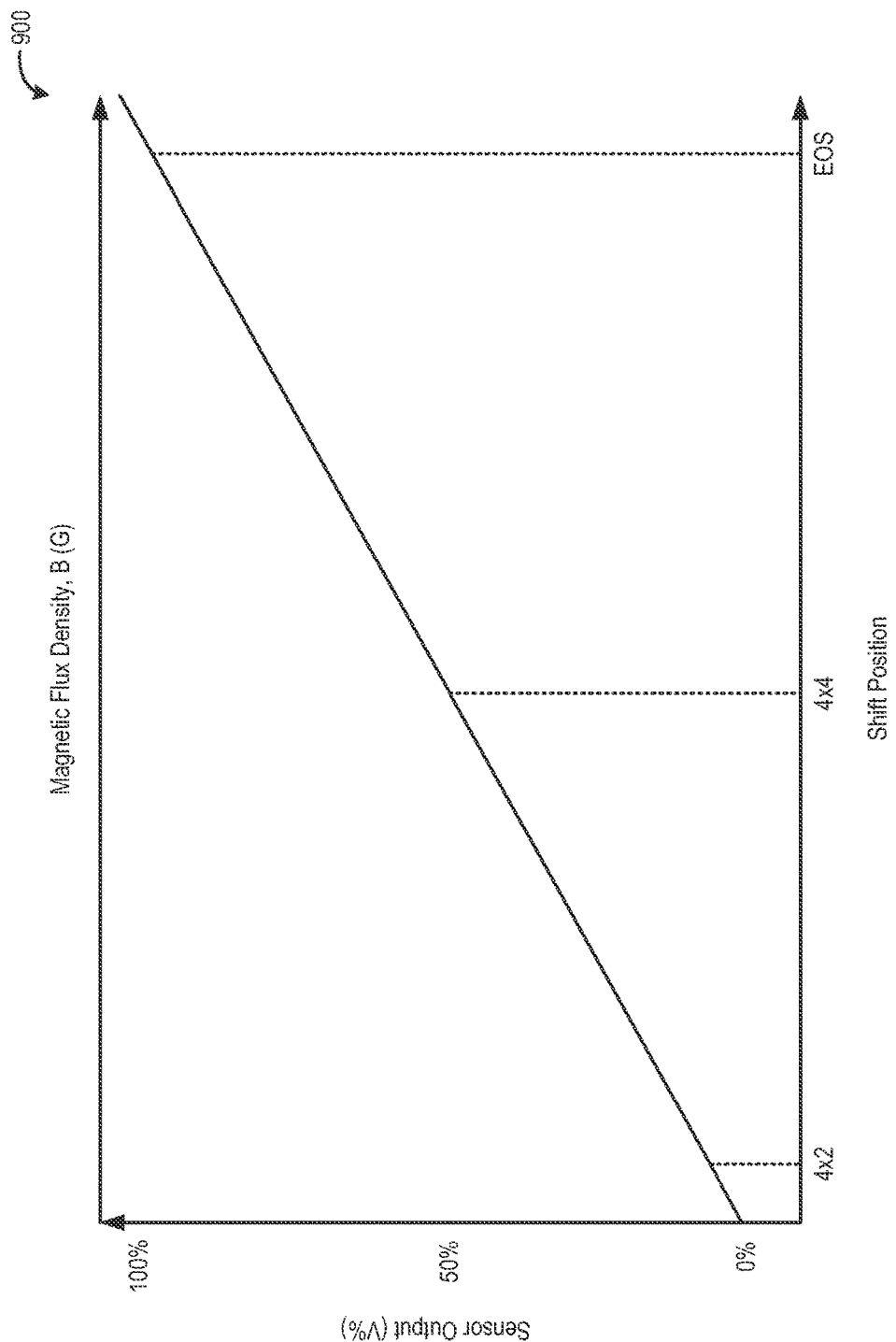
FIG. 9 shows a graph of the relationship between shifting position of the electromagnetic pulse disconnect assembly, magnetic flux density of the assembly, and a position sensor output.
Figure 10:
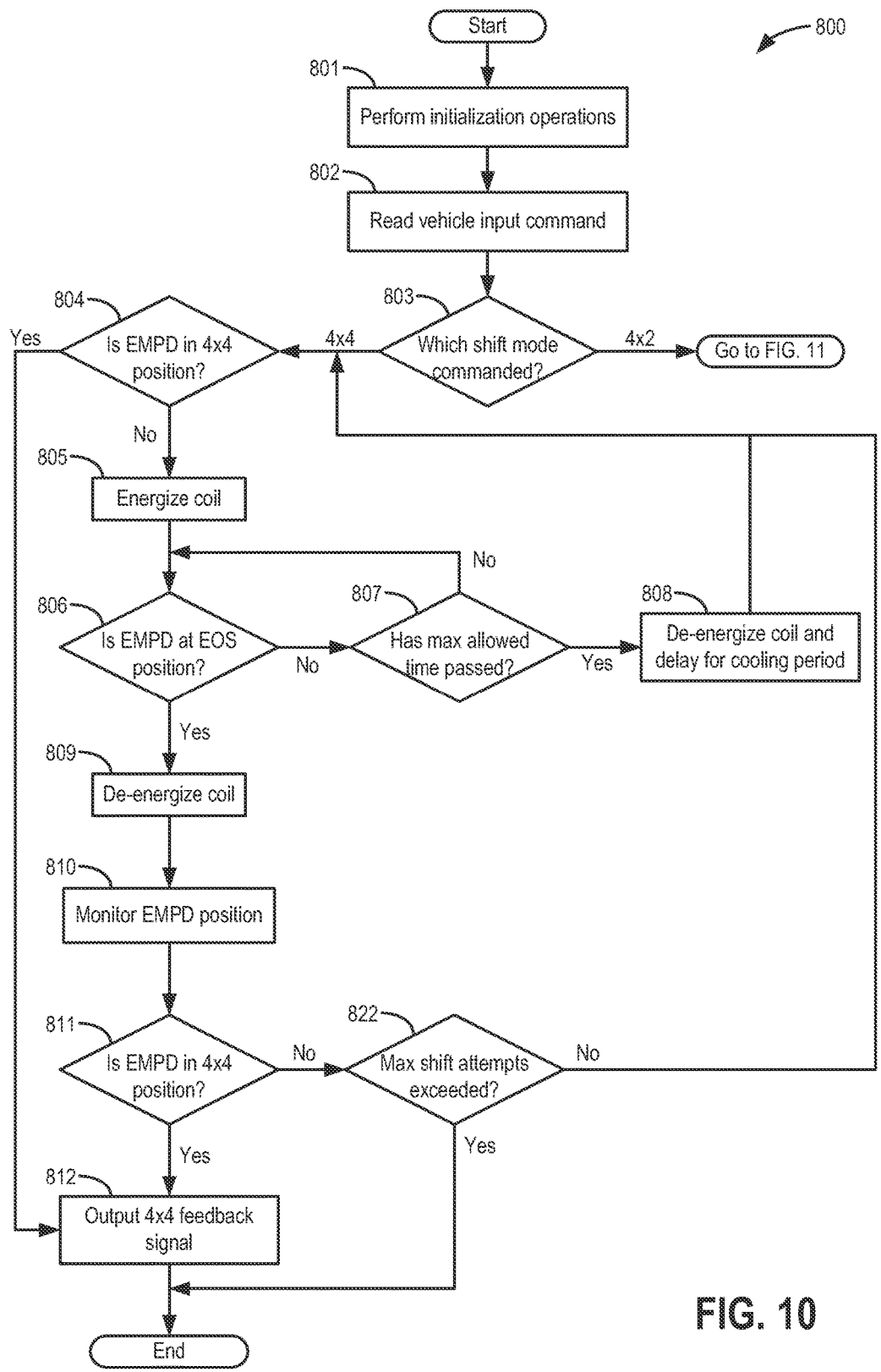
FIGS. 10 and 11 show a method for the general operation of the electromagnetic pulse disconnect assembly of FIGS. 2-8.
Figure 11:
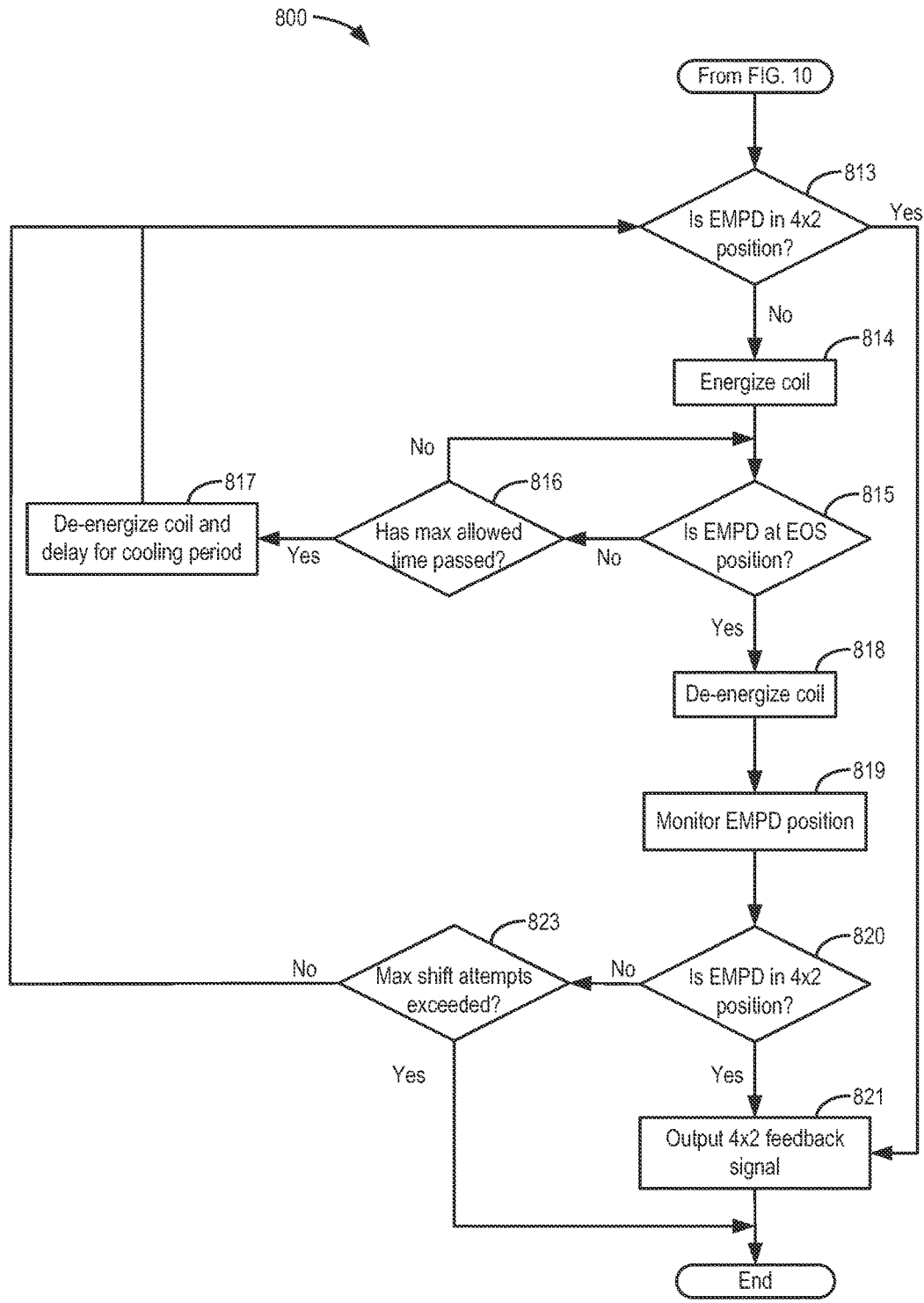

The following detailed description provides information regarding an electromagnetic pulse disconnect assembly and the methods of operation thereof for selectively connecting rotating components of a vehicle. An example embodiment of a vehicle powertrain is shown in FIG. 1, including an engine, a transmission, various axles and shafts, and wheels for providing motive power to the vehicle. An embodiment of an electromagnetic pulse disconnect assembly operated by discrete electrical pulses is shown in FIGS. 2-3 which may be used with the powertrain of FIG. 1. An exploded view of the electromagnetic pulse disconnect (EMPD) assembly is shown in FIG. 4 and shows the various components of the EMPD assembly including an electromagnetic coil, an armature cam assembly that interfaces with a shifter, and a clutch ring for selectively engaging two adjacent rotating components (e.g., such as shafts or axles). As such, the EMPD assembly may move the clutch ring into a 4×4 wherein the two rotating components are rotatably coupled to one another and into a 4×2 position wherein the two rotating components are not rotatably coupled to one another. FIGS. 5-7 show cross-sectional and assembled views of the electromagnetic pulse disconnect assembly in the different shift positions (e.g., 4×2, end of shift, and 4×4 positions). The EMPD assembly may further include a latching system which holds the assembly in the selected shift position without requiring the electromagnetic coil to remain energized. In this way, the coil may only be energized when moving from one shift position to another. An example latching mechanism of the latching system is shown in FIG. 8. The EMPD assembly may further include a magnetic position sensor assembly for determining a shift position of the assembly. FIG. 9 shows an example graph of the relationship between shifting position and an output of the magnetic position sensor. FIGS. 10 and 11 show a flow chart of a method for operating the electromagnetic disconnect assembly according to commanded shift modes (e.g., positions). The electromagnetic pulse disconnect assembly may be disposed at various positions along a vehicle drivetrain (such as the drivetrain shown in FIG. 1). For example, the EMPD assembly may be positioned proximate a wheel end (e.g., as a wheel end disconnect) and/or positioned on a front or rear wheel axle (e.g., as a center disconnect). Examples of various arrangements of a center EMPD assembly along a front or rear wheel axle are shown in FIGS. 12-16. While internal components of the EMPD assembly may be substantially the same between a center and wheel end disconnect, the outer housings (e.g., casings) of the assembly may be altered to accommodate the specific location along the drivetrain. An embodiment of a center electromagnetic pulse disconnect assembly is shown in FIGS. 17-24.

Regarding terminology used throughout this detailed description, vehicle operation where only two wheels receive power from the engine may be referred to as two-wheel drive, or 2WD, or 4×2. The corresponding position of the electromagnetic pulse disconnect may be referred to as a 4×2 position. Alternatively, vehicle operation where all four wheels receive power from the engine may be referred to as four-wheel drive, or 4WD, or 4×4. The corresponding position of the electromagnetic pulse disconnect may be referred to as a 4×4 position. In other examples, four-wheel drive may be interchangeably referred to as all-wheel drive (AWD), wherein normally unpowered wheels may receive power during certain conditions. To accomplish shifting between 4WD and 2WD, the electromagnetic pulse disconnect may selectively engage two rotating components. In some embodiments, the rotating components may be axles, shafts, couplers, wheel hub assemblies, or other devices used in the drivetrain of the vehicle for transmitting rotational power.

Modern vehicles may be operated by a large variety of drivetrain systems that involve selectively powering different wheels according to different operating conditions and/or operator (i.e. driver) commands. For example, all-wheel drive vehicles may provide power to two collinear wheels during a first operating mode, and upon detection of slippage may also provide power to one or more of the remaining wheels. In other examples, a smaller vehicle, such as a passenger car, may permanently provide power to only the front two wheels of the vehicle in order to increase fuel economy (front two-wheel drive). Yet in other examples, a vehicle may be configured to selectively switch between a two-wheel drive and a four-wheel drive mode, wherein during the four-wheel drive mode all four wheels receive power. There are advantages and disadvantages to each vehicle drivetrain, and the particular utility and anticipated function of each vehicle may aid in determining which drivetrain to incorporate.

FIG. 1 shows a simple diagram of a powertrain 100 of a vehicle. In this diagram, the body of the vehicle along with many other components are removed for better viewing of powertrain 100. It is noted that the powertrain includes the components seen in FIG. 1 while a drivetrain may refer to the components of FIG. 1 excluding the engine and transmission, described further below. According to the powertrain configuration, the vehicle of FIG. 1 may be have a selective 4WD drivetrain, wherein the rear wheels are powered in a rear-wheel drive mode (or 2WD mode) and all four wheels are powered in a 4WD mode, the 4WD drive mode different than the 2WD mode. Many utility vehicles such as larger trucks, all-terrain vehicles, and sports utility vehicles may incorporate rear-wheel drive rather than front-wheel drive for various reasons. One reason may be that rear-wheel drive is more conducive to load hauling or pulling, such as towing via a trailer connected to the rear of the vehicle.

In FIG. 1, a right rear wheel 101 and left rear wheel 102 are positioned at the rear of the vehicle, that is, the end located behind an operator of the vehicle. In this example, left, right, front, and rear orientations are given according to the perspective of the operator of the vehicle. Directional arrows for the front, rear, left, and right orientations are shown in FIG. 1. Accordingly, a right front wheel 103 and a left front wheel 104 are positioned at the front of the vehicle.

Power from the vehicle of FIG. 1 is generated by an internal combustion engine 110 having multiple cylinders. Engine 110 can be a fueled by gasoline or diesel according to the specific vehicle, and in the present example engine 110 contains six cylinders configured in a V orientation, forming a V6 engine. It is understood that engine 110 may be configured in different orientations and contain a different number of cylinders while providing power in a similar fashion as seen in FIG. 1. A shaft powered by engine 110 may be directly coupled to a transmission 115 providing the necessary gearing for driving the vehicle. Transmission 115 may be a manual or automatic transmission according to the requirements of the vehicle system. A rear drive shaft 131 may be connected to transmission 115 as an output of the transmission, providing power to the rear end of the vehicle.

During the aforementioned 2WD mode of powertrain 100, wheels 101 and 102 are powered via a rear axle 132. Rear axle 132 may be a single continuous shaft in some embodiments, or may be split into two axles in a bi-axle configuration, wherein the axle is interposed with a rear differential 121. In the bi-axle configuration, a first rear axle may be positioned between the rear differential 121 and the right rear wheel 101 and a second rear axle may be positioned between the rear differential 121 and the left rear wheel 102. The rear differential is also attached to rear drive shaft 131. The rear differential may serve several purposes, including allowing different relative rotational speeds between wheels 101 and 102 and transferring rotation (and power) from a single direction of drive shaft 131 into two perpendicular directions of rear axle 132, as seen in FIG. 1. For example, if the vehicle is turning in the left direction, then the inboard wheel (wheel 102) may rotate at a lower speed than the rotation of the outboard wheel (wheel 101). As such, rear differential 121 may allow the two wheels to rotate at different speeds in order to avoid slipping between the wheels of the vehicle and a road that the vehicle is traveling across during a turn.

For operation of the aforementioned 4WD mode, wherein the front wheels are driven in addition to the nominally-powered rear wheels, a system is provided to transfer power to the front of the vehicle. A transfer case 140 may be positioned near the output of transmission 115, the transfer case 140 may be configured to direct a portion of power from engine 110 to a front drive shaft 133. In one embodiment, the transfer case 140 may utilize a chain to transfer a portion of power from rear drive shaft 131 to front drive shaft 133. In a similar fashion to the rear drive system, for the front drive shaft 133 connects to a front differential 122. The front differential 122 may be substantially the same as rear differential 121, in that the front differential 122 allows relative rotational speeds of two wheels. As such, a front axle 134, which may be divided into two axles of a bi-axle system, may be attached to differential 122 on one end and to their respective front left wheel 104 and front right wheel 103. In this configuration, drive power from front drive shaft 133 may be transferred through front differential 122 and to wheels 103 and 104 via front axle 134. Since transfer case 140 allows power to be outputted to both the front and rear axles, the 4WD mode may allow all four wheels to be powered simultaneously. Said another way, when the vehicle is in the 4WD mode, both the front wheels 103 and 104 and back wheels 101 and 102 may be driven.

For switching between 4WD and 2WD in the example of FIG. 1, a system is needed that selectively engages and disengages power input to the front wheels. As such, a disconnect 150 may be provided inside transfer case 140 positioned in-line with an output shaft of transmission 115. In this configuration, disconnect 150 may also be integrally formed with or separate from transfer case 140. Disconnects may be used in vehicles with more than one drivetrain mode and enable engaging or disengaging between two separate, rotatable input components, such as wheel hubs, axles, and drive shafts. In the present example as seen in FIG. 1, disconnect 150 is positioned inside transfer case 140. In other vehicle systems, disconnect 150 may be placed in a variety of locations, including on front axle 134 or on front drive shaft 133, effectively dividing the shaft into two separate lengths as seen by the dashed disconnect 150 in FIG. 1. In other examples, the disconnect 150 may be positioned at a power transfer unit (PTU) to enable engagement and disengagement of the PTU shaft output. Furthermore, in some embodiments, multiple disconnects may be provided, wherein each of the multiple disconnects may be fixed to a separate component of powertrain 100. In one example, a first disconnect 150 may be placed inside transfer case 140 as seen in FIG. 1, while additional disconnects may be attached to the wheel hub of wheel 103, the wheel hub of wheel 104, and/or along front axle 134. In this way, the disconnects 150 may be controlled separately or in conjunction with each other. Depending on the particular location of the disconnect, various names are given, including wheel end disconnect and center axle disconnect. In the present example, disconnect 150 may selectively connect and disconnect gears inside transfer case 140 that drive the chain that powers front drive shaft 133. As such, disconnect 150 effectively divides transfer case 140 (and shaft 133) from the transmission 115 and rear drive shaft 131 via a system of gears, control mechanisms, and other structure, as described later in more detail.

During the 2WD mode when power is only provided to rear wheels 101 and 102, an input command may cause disconnect 150 to disengage fixed rotation between the two lengths of shaft 133, thereby providing no power to front axle 134 as well as wheels 103 and 104. As such, most power provided by engine 110 can be directed into rear drive shaft 131 with a relatively smaller amount of power diverted through transfer case 140 and into the length of shaft 133 connected to the disconnect. In other words, while disengaged, front wheels 103 and 104 may rotate freely without receiving tractive power from the engine. Also, the rotation of wheels 103 and 104 along with the rotation of axle 134 and the portion of shaft 133 disposed in front of disconnect 150 (as directed by the arrow in FIG. 1) does not affect the rotation of the rest of the drivetrain. Specifically, since disconnect 150 separates the two portions of shaft 133 located to the front and rear of the disconnect, rotation of the two lengths do not affect each other because they are separated (disengaged). If multiple disconnects 150 are provided, wherein one disconnect is in transfer case 140 or at shaft 133 while another disconnect is at wheel 103 and yet another disconnect is at wheel 104, then front axle 134 and a portion or all of shaft 133 may cease rotating when the disconnects disengage their input components. As such, front differential 122 may also cease rotating while the disconnects disengage rotation between wheels 103 and 104 and axle 134. In this way, fuel consumption may be reduced since wheels 103 and 104 may rotate freely without the added rotational inertia (moment of inertia) of axle 134 and frictional drag of differential 122.

During the 4WD mode when power is provided to all four wheels, an input command may cause disconnect 150 to engage fixed rotation between the two lengths of shaft 133, thereby providing power to all of shaft 133 as well as axle 134. In the current example, fixed rotation may be caused by engagement between a series of gears and/or splined shafts that allows the shafts on either end of disconnect 150 to rotate as a substantially single unit. During this operating mode, power from engine 110 power may be diverted substantially equally (or in other embodiments, non-equally) to wheels 101, 102, 103, and 104. It is noted that other drive modes are possible with the addition, change, and/or removal of components while still conforming to the scope of this disclosure.

Additionally, the powertrain 100 may include an electromagnetic pulse disconnect 160 positioned at one or more wheel ends to engage and disengage individual wheels with a corresponding axle (e.g., front axle 134 and/or rear axle 132). This type of disconnect may be referred to herein as a wheel end disconnect. The electromagnetic pulse disconnect 160 may alternately be positioned on one or both of the front axle 134 and the rear axle 132. Further, the electromagnetic pulse disconnect 160 may be positioned on either side of the front differential 122 and/or the rear differential 121. For example, in one embodiment, there may be a motorized disconnect 160 positioned on each side (e.g., both sides) of the front differential 122 on the front axle 134. Additionally, or alternatively, there may be a motorized disconnect 160 positioned on each side (e.g., both sides) of the rear differential 121 along the rear axle 132. In this way, the vehicle powertrain 100 may include a dual-disconnecting differential system. The type of disconnect positioned along the front or rear axles proximate to the front or rear differentials may be referred to herein as a center disconnect, as described further below with reference to FIGS. 12-16. The electromagnetic pulse disconnect described below may be used in one or more of the positions of the electromagnetic pulse disconnect 160 shown in FIG. 1.

As previously mentioned, some disconnects may be powered by vacuum diverted from the engine, such as engine 110 of FIG. 1. However, the inventors herein have recognized that vacuum may not be readily available or the vacuum power may undesirably fluctuate, thereby resulting in decreased disconnect control. Thus, alternate power sources may be utilized that provide simpler and more compact disconnect designs. As such, the inventors herein have proposed an electromagnetic pulse disconnect assembly that is actuated by pulsed electric power to an electromagnetic coil on the disconnect assembly. Electric power may not require running vacuum lines throughout the vehicle, thereby increasing the reliability of electric power over vacuum power. First, a description of the various components of the proposed electromagnetic pulse disconnect will be given, followed by a description of the operation of the disconnect including an example control scheme.

FIGS. 2 and 3 show an assembled view of an electromagnetic pulse disconnect (EMPD) assembly 200, which may be referred to herein as disconnect 200, and FIG. 4 shows an exploded view of the EMPD assembly 200. More specifically, FIG. 2 shows a cross-sectional assembled view of the disconnect 200 taken along line A-A in the assembled view of FIG. 3. As such, FIG. 2 shows internal views of the components of the disconnect 200 while FIG. 3 shows external views of the components of the disconnect 200. Internal components of the disconnect 200 may be surrounded by additional components and thus may not be visible in the external view of FIG. 3. Further, some internal components of the disconnect 200 may only be seen in the exploded view of FIG. 4.

Disconnect 200 comprises a generally circular shape with a hollow interior for enabling coupling between two rotating components. In particular, disconnect 200 may provide coupling between two shafts of a vehicle, as previously mentioned. Furthermore, one of the shafts may be powered while the other is unpowered, such that coupling between the two shafts enables power transfer and synchronous rotation. The two rotating components, such as shafts, may contain gear teeth or splines to mesh with a clutch ring 230 of the disconnect 200. As seen in FIG. 2 and FIG. 4, clutch ring 230 may contain a series of gear teeth 233 circumscribing an interior (e.g., inner) surface of the clutch ring 230. For example, as shown in FIG. 2, the clutch ring 230 includes two separate rows of teeth that are separated by ring-section not including teeth around the inner circumference of the clutch ring 230. Further, as shown in FIG. 2, a first set of gear teeth, proximate to a block shift spring 2408, have a larger width in an axial direction, as shown by arrow 203, than a second set of gear teeth positioned further away from the block shift spring 2408 than the first set of gear teeth. The block shift spring 2408 is discussed further below with reference to FIG. 5.

As the two shafts are located in the hollow interior of disconnect 200, clutch ring 230 may be shifting back and forth in an axial direction, as shown by arrow 203, to engage or disengage the two shafts. The axial direction may be parallel to a central axis 215 of the disconnect 200. In this sense, engaging the two shafts may include clutch ring 230 meshing with the gear teeth of both shafts, thereby effectively creating a substantially rigid connection between the shafts, such that power and rotation may be transferred (e.g., completely transferred) between the shafts. Conversely, disengaging the two shafts may include clutch ring 230 meshing with the gear teeth of only one of the shafts, thereby maintaining separation (e.g., no coupling) between the two shafts and allowing the shafts to independently rotate. As one example, the first set of gear teeth of the clutch ring 230, as described above, may engage with one shaft of the two shafts while the second set of teeth of the clutch ring 230 engages with the other shaft of the two shafts. When shifting from the 4×2 position to the 4×4 position, the clutch ring 230 moves in the positive axial direction, as shown by arrow 203.

Throughout this disclosure, translational movement in the axial direction (e.g., in a direction of central axis 215) as shown by the arrow 203 in FIGS. 2-3 may be referred to as the axial direction or positive axial direction, whereas translational movement in the opposite direction may be referred to as the negative axial direction. Furthermore, the negative axial direction may be a first direction while the positive axial direction may be a second direction. Finally, rotation about the axial direction or central axis 215 may also be referred to as clockwise or counterclockwise rotation depending on the direction or rotation. Since disconnect 200 and its various components comprise generally circular shapes, some of those components may rotate about their center axes which may be collinear with the axial direction.

The various components of EMPD assembly 200 may be contained in a housing (not shown in FIGS. 2-3). For example, the housing of the disconnect 200 may entirely surround and encase the components of the disconnect 200. As such, the disconnect housing may provide at least partial protection from foreign material such as grease, dust, and oil from interfering with the moving parts of disconnect 200. The housing may include a number of mounting flanges for fixing the disconnect 200 to a stationary vehicle component. Embodiments of a disconnect housing are shown in FIGS. 17-24 as described further below.

The disconnect 200 further includes an electromagnetic coil 220, a coil return spring 2418, an armature cam assembly 2405 including an armature 2406 and cam 2404, a shifter 2416, a block shift spring 2408, a latching ring housing 263 (also referred to herein as a carrier), and a latching mechanism including a latching ring 260, a latch cam ring 261, and a latch guide ring 271. The latch cam ring 261 and a latch guide ring 271 are shown in FIG. 4 and not seen in FIGS. 2-3. The electromagnetic coil 220 triggers actuation of disconnect 200 and movement of clutch ring 230, as described further below. The coil 220 includes a planar contact surface, facing in the axial direction, for contacting the armature 2406. The coil 220 further includes a contact assembly 303 which provides an electrical connection between the coil 220 and a printed circuit board (PCB) 207 of a controller 2414 of the disconnect 200. The contact assembly 303 is coupled to a side of the coil 220 opposite the side facing the rest of the components of the disconnect 200.

The controller 2414 (as seen in FIG. 4) including the PCB 207 includes several electrical devices 211 attached to the PCB 207. Electrical devices 211 may be microprocessors and other components for executing stored instructions (stored on a memory of the microprocessors) for various tasks. The controller 2414 may be referred to herein as the disconnect controller. As described further below with reference to FIGS. 10-11, the controller may receive various signals such as shifting commands (e.g., 4×2 or 4×4 commands) from a device external to the disconnect 200, such as a vehicle controller, and a position sensor 208 (hidden in FIGS. 2-4, but may be seen in FIGS. 19 and 20, as described further below). The controller 2414 may then process the received signals and send signals to various actuators of disconnect components, such as the coil 220 (e.g., by energizing the coil) to shift the clutch ring 230 into an engaged (e.g., 4×4 position) or disengaged (4×2 position) position. As such, the controller 2414 executes the instructions stored within its memory in combination with various sensors and actuators of the disconnect 200.

Figure 19:
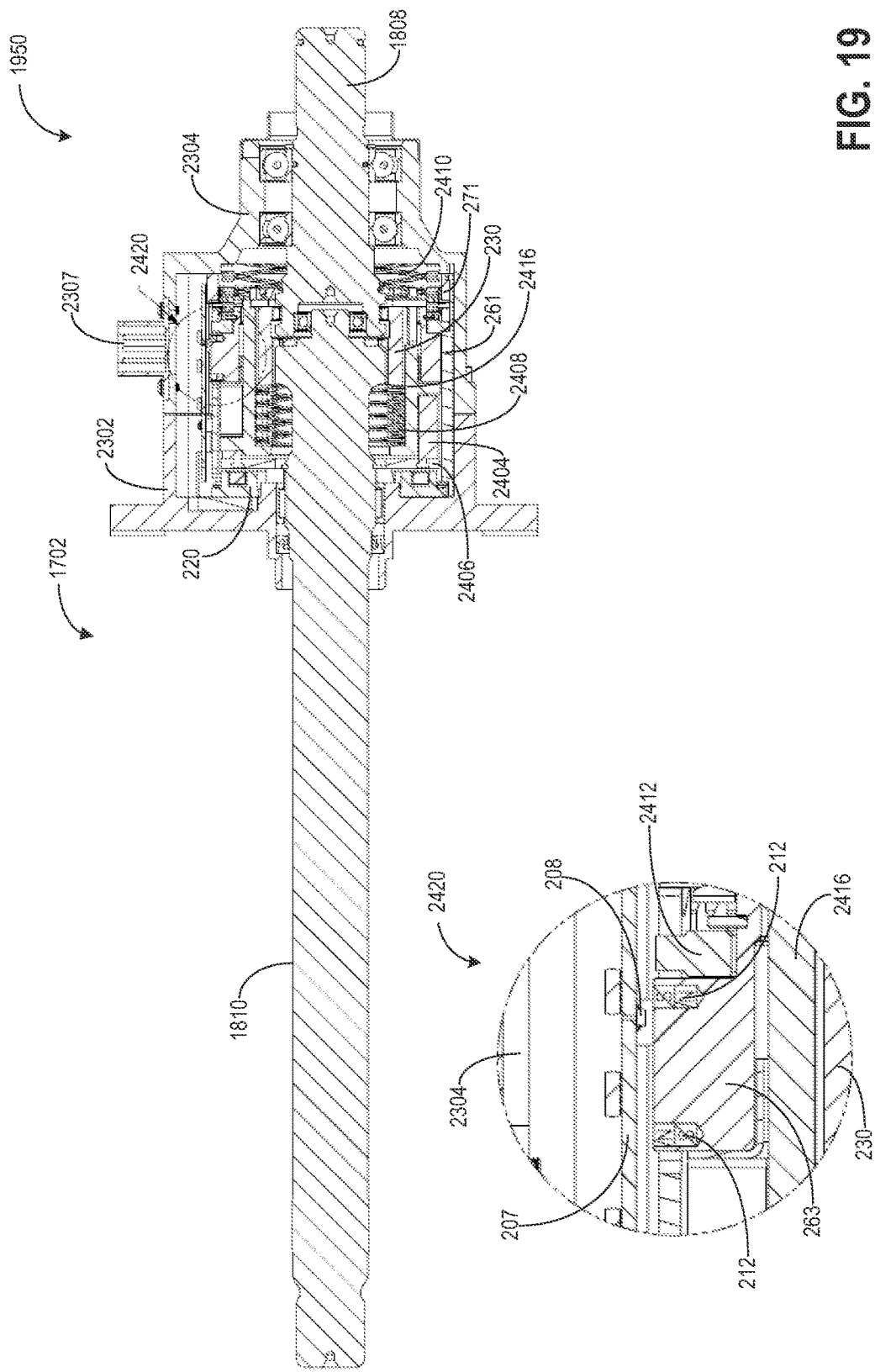
FIG. 19 shows a cross-sectional view of a center electromagnetic pulse disconnect.

Furthermore, a number of screws 210 may fix the PCB 207 to an outer surface of the latch cam ring 261. The position sensor 208 is coupled to a bottom surface of the PCB 207 (hidden in FIG. 4) and, as seen in FIGS. 19 and 20 and described further below, extends radially inward through a slot in a top surface of the latch cam ring 261. As such, the position sensor 208 interfaces with two magnets 212 integrated into the latching ring housing 263. More specifically, the two magnets 212 are included on a top (with respect to ground on which a vehicle sits when the disconnect 200 is installed on a vehicle drivetrain), outer surface of a first guide lug. As shown in FIG. 2, the two magnets 212 are imbedded into the latching ring housing 263 and are spaced a distance apart from one another across the width of the latching ring housing 263. The latching ring housing 263 includes three guide lugs 213 (as seen in FIG. 4) spaced around an outer circumference of the latching ring housing 263. Each of the three guide lugs 213 extend outwardly from an outer surface of the latching ring housing 263, in a radial direction (the radial direction perpendicular to the axial direction) and extend across the width of the latching ring housing 263, in the axial direction. The three guide lugs 213 aid in centering the latching ring housing 263 during translational (e.g., axial) movement. In this way, the magnets 212 in the topmost guide lug may remain in the same circumferential alignment with the position sensor 208 on the PCB 207. For example, the three guide lugs 213 interface with corresponding grooves (e.g., slots) 259 (as seen in FIG. 4) in an interior surface of the latch cam ring 261. In other embodiments, the latching ring housing 263 may include more or less than three guide lugs 213 and/or more or less than two magnets 212. As described further below, the axial alignment of the latching ring housing 263 and the current shift position of the disconnect 200 may be determined based on whether the position sensor 208 is in axially alignment with, and therefore senses, the magnets 212.

The armature cam assembly 2405 includes the armature 2406 which is directly coupled to (e.g., attached to) the cam 2404, without any additional intervening components separating the armature 2406 and the cam 2404. As one example, the armature 2406 and cam 2404 may be formed as one piece. The armature 2406 is a flat metal disk (e.g., thin, flat metal ring-like plate with a center aperture) positioned in close proximity to the stationary (e.g., non-rotatable, or rotatably fixed, around the central axis 215) coil 220. For example, when the coil 220 is not energized, the armature 2406 and the coil 220 are separated by an air gap 408, as shown in FIGS. 2 and 3. The coil return spring 2418 is also proximate to, and may surround a portion of, the coil 220. For example, as shown in FIG. 3, the coil 220 includes a stepped profile with a larger diameter portion and smaller diameter portion, the coil return spring 2418 being positioned against an inner, axially facing face of the larger diameter portion and surrounding an outer surface of the smaller diameter portion. As described further below with reference to FIGS. 5-7, when the coil 220 is energized, the coil 220 is attracted to the metallic armature 2406.

As seen in FIGS. 3 and 4, the cam 2404 includes a series of bi-directional ramps positioned around a circumference of the cam 2404. Each bi-directional ramp includes a vertex 307 proximate to the armature 2406. Further, the series of bi-directional ramps includes a base 309 positioned between two adjacent (e.g., consecutive) vertices 307. As such, each ramp portion of the bi-directional ramps extends between a vertex 307 and a base 309.

The shifter 2416 is positioned adjacent to the cam 2404. The shifter 2416 includes a guide portion 2415 and cage portion 2417. The guide portion 2415 is closer to the cam 2404, in the axial direction, than the cage portion 2417. The guide portion 2415 comprises a raised surface profile that extends radially away from an outer surface of the shifter 2416. The raised profile includes a series of guides positioned around a circumference of the shifter 2416. Specifically, each of the guides extends axially from a base portion of the raised profile and toward the cam 2404, the base portion extending around the circumference of the shifter 2416. The guides are positioned a distance away from one another around the circumference of the shifter 2416, thereby creating flat and planar, low points at the base portion and high points at an apex of each guide. Each of the guides of the guide portion 2415 interfaces with one apex 307 and corresponding ramps of the cam 2404. Further, each section of the base portion, between two adjacent guides, interfaces with one base 309 of the cam 2404. The number of vertices 307 of the cam 2404 is equal to the number of guides of the guide portion 2415 of the shifter 2416. As shown in FIG. 3, the guides of the guide portion 2415 may be shaped (e.g., with an apex and angled sides) to fit within an apex 307 of the cam 2404 when the disconnect 200 is in a 4×2 position, as explained further below with reference to FIG. 5.

The cage portion 2417 of shifter 2416 includes a plurality of external splines (e.g., fingers) 403 and posts 405 positioned around the circumference of the cage portion 2417 and extending from a center portion of the shifter 2416 in a direction opposite the direction in which the guides of the guide portion 2415 extend. The posts 405 and external splines 403 couple to a cage retainer 401 (shown in FIG. 4). The cage retainer 401 holds the clutch ring 230 within the cage portion 2417. Specifically, the posts 405 insert into corresponding apertures 407 in the cage retainer 401 and the external splines 303 insert and snap into corresponding apertures 409 in the cage retainer 401 in order to hold the cage retainer 401 in space against the shifter 2416.

The cage portion 2417 further includes a plurality of internal splines 2419 arranged on an interior surface of the cage portion 2417 and around a circumference of the shifter 2416. Each of the internal splines 2419 is attached to a corresponding post body including one of the posts 405. Each of the internal splines 2419 interfaces with one of a plurality of spline cutouts 231 positioned around an outer surface (e.g., along an outer diameter) of the clutch ring 230. As such, the clutch ring 230 is fixed to the cage portion 2417 of the shifter 2416 via mating engagement between the spline cutouts 231 and the splines 2419. As such, the internal splines 2419 transmit torque to the clutch ring 230. Said another way, the shifter 2416 and clutch ring 230 are fixed to one another and therefore rotate and translate together about the central axis 215 as a single unit. In this way, as described further below, translational movement of the shifter 2416 in the axial direction results in coordinated translational movement of the clutch ring 230, thereby providing selective engagement between the two rotating components external to disconnect 200.

As introduced above, the disconnect 200 includes a latching mechanism including the latching ring 260 (which rotates and translates in the axial direction), the latch cam ring 261, and the latch guide ring 271. The latching ring 260 comprises a generally circular, annular shape with a hollow interior. An outer surface (e.g., outer circumference) of latching ring 260 includes a number of protruding pins 2412 that are evenly spaced around the circumference of the latching ring 260. Said another way, the pins 2412 are pins attached to an exterior radial surface of the latching ring 260.

In alternate embodiments, the pins 2412 may not be evenly space around the circumference of the latching ring 260. The pins 2412 extend outwardly from the outer surface of the latching ring 260, in a radial direction (the radial direction perpendicular to the axial direction).

As seen in FIGS. 2 and 4, the latching ring housing 263 includes a stepped recess 239 for holding latching ring 260. For example, an inner surface of the latching ring 260 fits around an outer surface of the stepped recess 239. Further, the stepped recess 239 has a smaller diameter than the remaining portion of the latching ring housing 264 including the guide lugs 213. For example, latching ring housing 263 allows the latching ring 260 to rotate freely about the central axis 215 but only allows the latching ring 260 to translate (i.e. move linearly) a limited amount in the axial direction.

As shown in FIG. 4, the latching mechanism further includes a stationary latch cam ring 261 (which provides an inner track) and a stationary latch guide ring 271 (which provides an outer track). The latch cam ring 261 and the latch guide ring 271 (shown in FIG. 4) surround and are exterior to other components of the disconnect 200 described above, such as the armature cam assembly 2405, the clutch ring 230, and the shifter 2416. As such, the latch cam ring 261 and the latch guide ring 271 may be located directly interior to an inner surface of a housing of the disconnect 200. Latch cam ring 261 and latch guide ring 271 are held stationary relative to a fixed housing of the disconnect 200. That is to say, latch cam ring 261 and latch guide ring 271 do not rotate or translate with respect to the central axis 215. The latch cam ring 261 and the latch guide ring 271 are positioned adjacent to each other along the central axis 215 and form a pattern of peaks and valleys arranged around a circumference of the latch cam ring 261 and latch guide ring 271. A space formed by the peaks and valleys is referred to herein as a latching track profile 265 (shown in FIG. 8, described further below). More specifically, the latch cam ring 261 includes a first series of teeth forming a pattern of differently sized indentations extending into the latch cam ring 261 from a first end of the latch cam ring interfacing with the latch guide ring 271, wherein the first series of teeth extend around a circumference of the latch cam ring 261. The latch guide ring 271 includes a second series of teeth forming a pattern consistently sized indentations extending into the latch guide ring 271 from a first end of the latch guide ring 271 interfacing with the latch cam ring 261. The pins 2412 of the latching ring 260 fit within and are constrained to travel along and follow the latching track profile 265 formed between the latch guide ring 271 and the latch cam ring 261, as described further below with reference to FIG. 8.

The disconnect 200 further includes one or more retaining rings 277 that hold the components of disconnect 200 in place. Additionally, the disconnect 200 includes a washer 301, as seen in FIG. 4, the reduces wear between plastic components of the disconnect 200. As explained above, the armature 2406 comprises metal. However, other components of the disconnect 200, such as the shifter 2416, cam 2404, and latching ring housing 263 may comprise a plastic material. The washer 301 is positioned between the rotatable shifter 2416 and the stationary (e.g., fixed and non-rotatable) latching ring housing 263. As a result, wear between the shifter 2416 and latching ring housing 263 is reduced, thereby increasing the longevity and reliability of the disconnect 200. In some embodiments, the disconnect 200 may further include one or more seals for providing a protective seal between the disconnect components and the rotating component, such as an axle and a housing of the disconnect 200. As such, dust and other material may be substantially prevented from entering or escaping the interior of disconnect 200.

The disconnect 200 described above with reference to FIGS. 2-4 includes a series of stationary and moving components. When a component is described as being stationary (e.g., stationary in all direction) it means it does not move relative to other components of the disconnect and relative to an outer housing surrounding the components of the disconnect 200. Further, moving components may rotate around the central axis 215 of the disconnect 200 and/or translate in the positive and/or negative axial direction, with respect to the central axis 215. As described above, latch cam ring 261 and latch guide ring 271 are completely stationary components and do not translate in the axial direction or rotate about the central axis 215. As such, these components are fixed and may be coupled to a housing of the disconnect that surrounds and encases the disconnect components. The coil 220 is rotationally fixed (e.g., does not rotate about the central axis 215) and is constrained to move only a limited amount in the axial direction (e.g., just enough to close the air gap between the coil 220 and armature 2406). The shifter 2416 is coupled to the clutch ring 230 and these components translate in the axial direction and rotate about the central axis 215 together as one unit. In response to translational movement of the shifter 2416, the latching ring housing 263 and latching ring 260 also translate in the axial direction (e.g., positive and negative axial direction). However, the latching ring housing 263 is fixed from rotation such that it does not rotate around the central axis 215. The latching ring 260 may also rotate about the central axis 215 as is travels back and forth between and along a track surface of the latch cam ring 261 and a track surface of the latch guide ring 271 (the latching track profile 265 formed between the track surfaces of the latch cam ring and latch guide ring). The armature 2406 and cam 2404 are fixed together as one unit (e.g., armature cam assembly 2405) and thus rotate and translate along the axial direction together. When the coil 220 is not energized, it is not attracted to and attached to the armature 2406. As a result, the armature 2406 and cam 2404 may freely rotate about the central axis 215 along with the shifter 2416. However, when the coil 220 is energized, the armature 2406 is attracted to the coil 220 and touches the coil 220. As a result, the armature 2406 and cam 2404 slow down or stop rotating. Further details on the shifting modes of the EMPD 200 are discussed below with reference to FIGS. 5-11.

In this way, the EMPD assembly 200 may adjust the clutch ring of the assembly into a 4×4 position wherein two rotating components (e.g., axles or shafts of a vehicle powertrain) are rotatably coupled to one another and into a 4×2 position wherein two rotating components are not rotatably coupled to one another. FIGS. 5-7 show cross-sectional and assembled views of the EMPD 200 in the different shift positions (e.g., 4×2, end of shift, and 4×4 positions, respectively). Components of the EMPD shown in FIGS. 5-7 may be the same as components shown in FIGS. 2-4 and as described above. As such, these components are similarly numbered and may not be re-introduced below with reference to FIGS. 5-7. Specifically, FIG. 5 shows a schematic 500 of a first assembled view 501 and first cross-sectional assembled view 503, taken along section A-A of view 501, of the disconnect 200 in a first, 4×2 position (e.g., disengaged position). FIG. 7 shows a schematic 700 of a second assembled view 701 and second cross-sectional assembled view 703, taken along section A-A of view 701, of the disconnect 200 in a second, 4×4 position (e.g., engaged position). FIG. 6 shows a schematic 600 of a third assembled view 601 and third cross-sectional assembled view 603, taken along section A-A of view 601, of the disconnect 200 in a third, end of shift (EOS) position. The positions may correspond to shifting modes of the vehicle, wherein a shift command may be sent to a vehicle controller, which may in turn be sent to the disconnect controller 2414 in order to actuate EMPD assembly 200 accordingly.

In the 4×2 position, shown in FIG. 5, clutch ring 230 is only engaged with one rotating component (not shown) while another rotating component (not shown) is allowed to rotate independently. In the 4×2 position, the coil 220 and the armature 2406 are separated from one another by air gap 408. Additionally, the guides of the guide portion 2415 of the shifter 2416 are positioned against (and interfacing with) the apexes 307 of the cam 2404. Further, the base portions of the guide portion 2415 of the shifter 2416 are positioned against (and interfacing with) the bases 309 of the cam 2404. As such, empty space between the shifter 2416 and cam 2404 may be minimized relative to the 4×4 position. Since the shifter 2416 is coupled to the clutch ring 230, the shifter 2416 rotates along with the clutch ring 230 (and the rotating component it is engaged with). Additionally, the cam 2404 rotates along with the shifter 2416 due to the interfacing guides and bi-directional ramps of the shifter 2416 and cam 2404, respectively.

When a shift from the 4×2 to the 4×4 mode is commanded, the vehicle controller may determine if it is safe to connect the two rotating components. For example, in some embodiments, the two rotating components may need to be rotating in the same direction corresponding to vehicle forward or reverse. Upon receiving a shift command to shift the disconnect 200 into the 4×4 position, the controller 2414 provides electric current to the electromagnetic coil 220 via the contact assembly 303 (described above with reference to FIG. 3) in order to energize the coil 220. According to the properties of electromagnetism, energizing coil 220 may create a magnetic field surrounding the coil. As such, coil 220 is attracted to armature 2406, which is composed of a suitable metallic material for interaction with the magnetic field produced by coil 220. While coil 220 is fixed from rotating, armature 2406 (and cam 2404, attached to the armature 2406) rotates with the shifter 2416 and clutch ring 230, as described above. Since coil 220 is free to translate a limited amount, coil 220 moves, in the positive axial direction, into contact with armature 2406, effectively closing the air gap 408 and thereby creating friction between the coil 220 and the armature 2406. As such, rotation of armature 2406 may be slowed or stopped. When the armature 2406 and cam 2404 are rotating slower than the shifter 2416, the bi-direction ramps of the cam 2404 produce a force against the guides of the shifter 2416. As a result, as shown in view 701, the guides of the shifter 2416 slide partially along the ramps of the cam 2406, away from the apexes and toward the bases of the cam 2406. This causes the shifter 2416 to move away from the cam 2404, in the positive axial direction (shown at 203). Since the shifter 2416 is attached to the clutch ring 230, both components translate in the axial direction (e.g., positive axial direction) as a single unit. In this way, the actuation force provided by energized coil 220 and armature 2406 may force the clutch ring assembly in the positive axial direction and into engagement with a second rotating component. The axial motion of the shifter 2416 subsequently acts on the clutch ring 230 to produce a shift from the disengaged to the engaged position, thereby shifting from the 4×2 to the 4×4 position.

As described above and further below with reference to FIG. 8, the disconnect 200 includes a latching mechanism for holding the disconnect in the 4×4 position without requiring the coil 220 to stay energized. For example, it is advantageous to only energize the coil 220 when shifting from one position to another. However, if the latching mechanism is not included in the disconnect assembly, de-energizing the coil 220 would result in the armature 2406 and cam 2404 being free to rotate along with the shifter 2416 and the return spring 2410 then returns the clutch ring 230 to the 4×2 position (by translating the shifter 2416 and clutch ring 230 in the negative axial direction). Instead, when the 4×4 position in commanded, the coil 220 is energized and the clutch ring 230 is shifted into the 4×4 position as described above. In addition to this motion, the latching mechanism holds the disconnect 200 in the 4×4 position, even after the coil 220 is de-energized. In this state, the vehicle will stay in the 4×4 mode until the 4×2 mode is selected.

When a shift from the 4×2 to the 4×4 mode is commanded, the controller 2414 again provides electric current to the electromagnetic coil 220 via the contact assembly 303 in order to energize the coil 220. As a result, the guides of the guide portion 2415 of the shifter 2416 travel further up the ramps of the cam 2404 until the guides come into contact with the non-ramped base ends of the bi-directional ramps (e.g., bases 309) of cam 2404. This position is referred to as an end-of-shift (EOS) position and is shown in FIG. 6. The additional travel distance causes the latching mechanism to flip, as described further below with reference to FIG. 8. Once the latching mechanism has flipped, the coil 220 may be de-energized. When the coil 220 is de-energized from the EOS position, the coil 220 moves away from the armature 2406 and an air gap 408 is again present between the coil 220 and armature 2406. The armature 2406 and cam 2404 are then free to move along with the shifter 2416 and the return spring 2410 returns the clutch ring 230 to the 4×2 position. The vehicle drive mode may cycle between the 4×2 and 4×4 position every time the coil 220 is energized for a brief duration or pulsed.

Additionally, if the clutch ring 230 cannot shift because the clutch teeth are not aligned or binding has occurred, the block shift spring 2408 deflects and allows the shifter assembly to complete the commanded motion. When the teeth are aligned or when the binding is removed, the block shift spring 2408 will force the clutch ring into the desired position.

As described above, the latching mechanism holds the disconnect 200 in the selected shift position without requiring the electromagnetic coil to remain energized. In this way, the coil may only be energized when moving from one shift position to another. An example latching mechanism that may be employed in the disconnect 200 is shown in FIG. 8. Specifically, FIG. 8 shows a schematic 750 of a latching track profile 265 from a top view of disconnect assembly 200. The latching track profile 265 is formed between a stationary latch cam ring 261 and a stationary latch guide ring 271. The latching mechanism further includes a translating (in the axial direction) and rotating latching ring 260 including a plurality of radially oriented pins 2412 that travel along the track profile (e.g., track) 265. A travel path of one pin 2412 of the latching ring 260 is shown in FIG. 8. Track surfaces of the latch cam ring 261 and latch guide ring 271 form a pattern of peaks and valleys arranged in the circular latching track profile 265. As introduced above with reference to FIGS. 3-4, the latch guide ring 271 includes a second series of teeth 751 forming a pattern of consistently sized grooves (e.g., indentations), two grooves 752 and 759 of the series of grooves shown in FIG. 8, extending into the latch guide ring 271. The latch cam ring 261 includes a first series of teeth 753 forming a repeating pattern around a circumference of the latch cam ring 261 of shallower grooves (e.g., detent), two shallower grooves 754 and 757 shown in FIG. 8, and deeper grooves (e.g., detent), one deeper groove 755 shown in FIG. 8. The latching track profile 265 is formed by the series of grooves (e.g., 752 and 759 shown in FIG. 8), shallower grooves (e.g., 754 shown in FIG. 8), and deeper grooves (e.g., 755 shown in FIG. 8), and the space separating the teeth of the latch cam ring 261 and latch guide ring 271. Only a portion of all the grooves of the latch cam ring 261 and latch guide ring 271 are shown in FIG. 8.

The latching ring 260 rotates as the pins 2412 travel up and down the peaks and valleys of the track 265, the peaks and valleys of the track formed by the track surfaces (e.g., tooth pattern) of the latch cam ring and latch guide ring. The grooves, along the track surface, of the latch cam ring 261 include the shallower grooves 754 and 757 where the pin 2412 may stop in a stable position. The pin 2412 may also stop in the deeper groove 755 which is a naturally stable position. When the shifting mechanism of disconnect 200 shifts position (and moves in the positive axial direction) as previously described, the latch ring pins 2412 are forced against the track surface of the latch guide ring 271 and travel along the latch guide ring side of the track 265. The motion of the pins 2412 is stopped at a precise point by stop grooves 752 and 759 on the latch guide ring 271. A first stop groove (e.g., EOS groove) 752, which is the latch groove guide EOS position 756, is positioned such that the latch ring pin 2412 will advance to the stable deeper groove 755 and the latch groove 4×2 position 758 when a shift to the 4×2 mode is completed. A second stop groove 759 is positioned at 760 in such a way that the latch ring pin 2412 will advance to the stable shallower groove 757 and the latch groove 4×4 position 762 when a shift to the 4×4 mode is completed. The latch ring rotates and advances in one direction as it alternates between shallower grooves 754 and 757 and deeper grooves 755 each time a mode shift is made. It should be appreciated that the latching system may be reversed so that the deeper groove 755 corresponds to the 4×4 position and the shallower groove 754 and 757 corresponds to 4×2 position.

When the electromagnetic coil 220 is turned on or energized, clutch ring 230 and latching ring 260 translates in the positive axial direction, as shown at 203. As such, the pins 2412 of latching ring 260 also moves generally in the positive axial direction (and against the latch guide ring 271). In addition to that movement, the pins may also rotate about the central axis of the disconnect 200 due to the offset positioning between the latch cam ring 261 and the latch guide ring 271. Explicitly, rotation about the central axis is shown by the clockwise rotational direction 764. In this way, axial movement of the pins 2412 reacts against latch guide ring 271 such that the teeth of latch guide ring 271 act as a wedge against which the pins 2412 may slide. The sliding motion of the pins 2412 along the track surface of the latch guide ring 271 cause the latching ring 260 to rotate until the pins 2412 reach a groove in the track surface. In the example seen in FIG. 8, the pin 2412 may start at a first 4×4 groove 754 (or second self-locking position) of the profile 265, and upon energizing the coil, the pin 2412 follows the energized path 770 and moves up to the first EOS groove 752. When the pin 2412 is inside EOS groove 752, the clutch ring and latching ring assemblies may correspondingly be in the EOS position.

As previously mentioned, upon reaching the EOS position with the pin 2412 in the EOS groove 756, the coil may be turned off (e.g., de-energized), whereupon the armature 2406 and cam 2404 are free to rotate with the shifter 2416, thereby moving the guides of the shifter 2416 back down the ramps of cam 2404 which moves the shifter axially toward the cam 2404. In turn, the clutch ring 230 moves in the negative axial direction. In a similar way, the pin 2412 of latching ring 260 may also generally move in the negative axial direction while also rotating about the central axis of the disconnect 200, following the profile of the latch cam ring 261 along de-energized path 772 until the 4×2 groove (e.g., deeper groove) 755 (e.g., first self-locking position) is reached by the pin 2412. If a subsequent shifting command were given, then the coil 220 would again be turned on (e.g., energized), causing the clutch and latching ring assemblies to move in the axial direction. As a result, the pin 2412 follows the energized path 774 until it reaches the second stop groove 759. The coil 220 may again be turned off (e.g., de-energized), allowing the shifter 2416 and clutch ring 230 to move in the negative axial direction, thereby causing the pin 2412 to travel along the profile of the latch cam ring 261, along the de-energized path 776, until the pin comes into contact with a second 4×4 groove (e.g., shallower groove) 757. In this way, when the pin 2412 is located in 4×4 grooves 754 or 757 (e.g., second self-locking positions), the disconnect assembly 200 is in the 4×4 position. Similarly, when the pin 2412 is located in the 4×2 groove 755 (e.g., first self-locking position), the disconnect assembly 200 is in the 4×2 position. In this way, when the disconnect is in one of the first or second self-locking positions, the disconnect remains in the corresponding 4×2 or 4×4 position without maintaining the coil 220 energized (e.g., the coil may be turned off). Although only five grooves are shown in FIG. 8, it is understood that the pattern of the grooves and profile 265 are repeated along the periphery of latch cam ring 261 and latch guide ring 271. Furthermore, multiple pins 2412 may be located in profile 265. In particular, the number of grooves may be a multiple of the number of pins 2412 of latching ring 260. For example, if the latching ring were to contain 5 pins, then there may be 20 or 25 grooves located on the latching track profile 265. As shown in FIG. 4, the latching ring 260 includes 8 pins. However, a number of pins greater or less than 8 is also possible.

From the shifting procedures to move the disconnect assembly 200 into the 4×2 and 4×4 positions, it can be seen that the clutch ring assembly (e.g., clutch ring 230, shifter 2416, cam 2406, block shift spring 2408 and cage retainer 401) and latching ring assembly (e.g., latching ring 260, retaining ring 277, and latch ring housing 263) operate as separate components with common translational motion in the axial direction. As such, the clutch ring and latching ring assemblies may translate as a substantially single unit. The clutch ring and latching ring assemblies may be collectively referred to as a cam follower mechanism. The latching ring assembly, including the latching ring 260 and latching ring housing 263, interacts with the latching track profile 265 to hold the latching ring assembly and clutch ring assembly in the 4×2 and 4×4 positions via intermediate shifting to the EOS position. When coil 220 is energized, the clutch and latching ring assemblies may be moved and held in the EOS position. Conversely, when coil 220 is de-energized, the clutch and latching ring assemblies may be moved and held in their steady-state 4×2 and 4×4 positions by the latching ring assembly (e.g., latching ring mechanism described above). Again, latching ring housing 263 may allow latching ring 260 to rotate freely about the central axis of the disconnect 200 but constrain the latching ring 260 to translate in the axial direction a limited amount. The limited amount of translational movement may decrease the amount of rotational drag between the latching ring 260 and latching ring housing 263 during shifting motions. Furthermore, latching ring housing 263 may be constrained in disconnect 200 such that the latching ring housing 263 can translate but is fixed from rotating. As such, latching ring housing 263 may apply only axial (translational) forces to the latching ring 260 independent of forward or reverse vehicle direction.

The latching track profile 265, providing the grooves corresponding to each of the 4×2, 4×4, and EOS positions of the disconnect 200, is attached to the latching ring assembly via the pins 2412 of latching ring 260. The track profile 265 may be stationary within a housing of the disconnect and biased to constrain the pins 2412 to rotate in a single rotational direction. As seen in FIG. 8, the biased feature of profile 265 may be produced by the misalignment between latch cam ring 261 and latch guide ring 271. Particularly, latch cam ring 261 may be shifted in the clockwise direction such that the pin is biased to move only in the clockwise direction and not in the counterclockwise direction. In general, the pin 2412 may be constrained by track 265 to only rotate in a single rotational direction without reversing directions. In this way, when latching ring 260 is actuated in the positive or negative axial directions by either the clutch ring assembly or de-energizing of the coil 220, the pins 2412 move accordingly in the clockwise direction until reaching one of the grooves 754, 752, 755, 759, or 757. If the clutch ring and latching ring assemblies do not move to the EOS position such that the pin 2412 does not reach the EOS groove 752 or groove 759, then the components may return back to the previous state. It is noted that the 4×2 and 4×4 grooves may be reversed. The clutch ring assembly may drive movement of the disconnect 200 between the 4×2 and 4×4 positions while the latching ring assembly may hold the disconnect 200 in the 4×2 and 4×4 positions.

The EMPD assembly 200 may further include a magnetic position sensor assembly for determining a shift position of the assembly, as introduced above. The position sensor assembly includes the magnets 212 embedded into the latching ring housing 263 and position sensor 208 shown in FIGS. 19 and 20, as described further below. Since the latching ring housing 263 is constrained to freely translate but cannot rotate, magnets 212 may only translate without rotating about the central axis 215 of the disconnect 200. The position sensor 208 may be a magnetic sensor such that the sensor can detect the strength of the magnetic force of magnets 212. Therefore, an external vehicle controller receiving signals from sensor 208 may correlate magnetic force with the position of the disconnect assembly 200, that is, the position of the clutch ring assembly and latching ring assembly, in particular clutch ring 230. For example, sensor 208 may be mounted directly above magnet 212 when the disconnect 200 is in the EOS position. The sensor 208 may detect the strength of the magnetic force of magnet 212 throughout its axial movement from the EOS position to the 4×2 and 4×4 positions. In this way, the sensor 208 may detect the 4×2, 4×4, and EOS positions of the clutch ring 230 along with any clutch ring position in between or beyond the 4×2, 4×4, and EOS positions. With magnetic force signals from sensor 208, the vehicle controller or other controller may convert force magnitude to the position of disconnect 200. It is noted that the performance of sensor 208 may be unaffected by the localized magnetic field generated by coil 220 since the magnetic coil field may be concentrated around the coil 220 and armature 2406. By using a magnetic sensor 208, no contact may be necessary between the sensor assembly and actuating components of disconnect 200. As such, the non-contact sensor assembly may reduce degradation of disconnect 200.

FIG. 9 shows an example graph 900 of the relationship between shifting position of the EMPD assembly 200 and an output of the magnetic position sensor 208. As seen, the first horizontal axis of graph 900 is shift position of the disconnect assembly 200 while the vertical axis is the signal output of sensor 208, measured in a percentage of a maximal voltage signal output by the position sensor (%). The second horizontal axis of graph 900 is magnetic flux density, B, of the magnets 212, measured in Gauss (G). In this example, a linear relationship exists between shift position and sensor output and magnetic flux density and sensor output. While the 4×2 position corresponds to a lower voltage signal (e.g., around 0%), the 4×4 position corresponds to a higher voltage signal (e.g., around 50%), and the EOS position corresponds to the highest voltage signal of graph 900 (e.g., around 100%). In this case, if sensor 208 outputs a higher voltage when a higher magnetic flux from magnet 212 is detected, then sensor 208 may be positioned directly above magnets 212 when disconnect 200 is in the EOS position. As such, detected magnetic flux (e.g., force) may be highest at the EOS position as is reflected by the highest output voltage of graph 900. In the context of graph 900, higher or lower voltage signals or magnetic fields are relative to each other. For example, the voltage signal corresponding to the 4×4 position may be higher than the voltage signal of the 4×2 position but lower than the voltage signal of the EOS position. Other relationships between position and sensor signal output may be possible while still pertaining to the scope of the present disclosure.

As one embodiment, only a limited-duration pulse of current may be delivered to coil 220 of the EMPD assembly 200 to conduct a shifting operation regardless of vehicle speed. When coil 220 is energized to shift disconnect 200, the magnetic position sensor measures the position of clutch ring 230, via the clutch and latching ring assemblies and the embedded magnet 212, in real time until the EOS position is reached or a maximum allowable time for the coil pulse has passed. The maximum allowable pulse time may be a pre-determined time to energize coil until automatic de-energizing occurs to avoid excessive degradation of the coil 220 and armature 2406 and heat generation. During an event when the clutch ring assembly cannot shift, such as in a pinch torque condition, the maximum allowable pulse time may not allow the coil 220 to remain continuously energized and damage the disconnect assembly 200. When the coil 220 is de-energized, the position sensor 208 may track the position of the disconnect assembly 200 until a steady-state is reached corresponding to the 4×2 or 4×4 positions. If the desired position is not detected, then the coil 220 may again be energized to shift the clutch and latching ring assemblies until the desired position is attained. In this way, by minimizing energizing time of the coil 220, the amount of energy consumption may be reduced. Pulsing current through coil 220 may consume significantly less energy than other disconnect assemblies that may require a continuous flow of current. Furthermore, other adverse effects associated with electromagnetic disconnect systems may be reduced, such as component wear, heat generation, and noise, vibration, and harshness.

In this way, with the EMPD assembly 200 of FIGS. 2-9, a self-contained disconnect system is provided that may utilize a smart controller and closed loop system to reduce vehicle overhead control. The smart controller aspect of EMPD assembly 200 may be manifested through use of controller 2414. In particular, the external vehicle controller may send command signals for shifting to 4×2 or 4×4 modes to the controller 2414 of disconnect assembly 200 while receiving feedback signals to verify the disconnect position. In one example control system of disconnect assembly 200, the feedback signals may be analog so a single wire may carry disconnect position and error signals. Furthermore, in vehicles that incorporate multiple disconnect assemblies 200, the feedback signals may report the status of each disconnect assembly 200 during normal operation, servicing, and if any of the disconnects fail. Additionally, if one disconnect of a vehicle becomes out-of-sync during servicing, the control system may correct the sync issue by actuating one disconnect assembly independent of the others in the vehicle. Lastly, if one disconnect assembly fails such that it is no longer operable, the vehicle controller or other controller may report the failure and failure location to an operator of the vehicle or a technician.

In one example, the disconnect controller 2414 may be integrated into the housing of the disconnect 200, the latch cam ring of the disconnect 200, or packaged in an external assembly attached to EMPD assembly 200 via one or more wires. The disconnect controller may include various electrical components such as a voltage regulator, microprocessor, and a coil driver. The coil driver may be one of a dry contact relay or a solid state switch, for example, that provides electrical current to energize the electromagnetic coil 220 when instructed (commanded) by the microprocessor. As explained above with reference to FIG. 4, when the disconnect controller is part of the disconnect 200, the electrical components may be attached to PCB 207 as devices 211.

In some embodiments, an additional, multi-plate clutch may be coupled in series with the disconnect 200 including the clutch ring 230. As one example, the multi-plate clutch (which may also be referred to as a friction clutch) may include a set of wedge plates rotationally coupled to one of the two rotating components that are selectively engaged by the clutch ring 230 and a set of clutch plates rotationally coupled to the other one of the two rotating components that are selectively engaged by the clutch ring 230. A pressure plate (e.g., piston plate) may compress the wedge and friction plates to synchronize the speeds between the two rotating components. The clutch ring 230 of the disconnect 200 may then be used as a locking clutch to lock the two rotating components to one another, thereby fully engaging the two rotating components for complete torque transfer between the two rotating components. It should be noted that the multi-plate clutch described above may be included in series with any one of the EMPD assemblies described herein.

FIGS. 10 and 11 depict a method 800 for operating the EMPD assembly 200. It is noted that the various steps and decision-making processes may be stored in the memory of a main vehicle controller external to the disconnect assembly 200. In other examples, a localized hub controller may be coupled directly to assembly 200 and execute the steps of method 800 while communicating with the external, main vehicle controller. In yet another example, the various steps and decision-making processes of method 800 may be stored in a memory of the disconnect controller (such as controller 2414 shown in FIG. 4). As such, the disconnect controller may execute method 800 in combination with the various sensors (e.g., position sensor 208) and actuators (e.g., contact assembly 303 of coil 220) of the EMPD assembly. To reiterate, the 4×2 (2WD) or first mode corresponds to the first position where clutch ring 230 engages only on rotating component (e.g., shaft or axle) while the 4×4 (4WD) or second mode corresponds to the second position where clutch ring 230 engages both rotating components (e.g., both shafts or components arranged proximate to the EMPD), thereby coupling the two rotating components together. Lastly, the end-of-shift (EOS) position corresponds to where the clutch ring 230 and other attached components are farthest shifted in the axial direction when coil 220 is energized. This can be seen graphically in FIG. 9, where the EOS position is the rightmost position compared to the 4×2 and 4×4 positions. For ease of understanding, reference will be made to components and description presented with regards to the previous figures. However, method 800 may be employed in alternate EMPD assemblies having different configurations than described above.

First, referring to FIG. 10, at 801 the method includes performing a series of initialization operations. The initialization operations may include calibrating the position sensor (e.g., position sensor 208) so magnetic force may be correlated to the 4×2, 4×4, or EOS positions, determining direction of travel of the vehicle, and synchronizing the rotational speed of the two rotating components (e.g., the two rotating components that may be selectively and rotatably coupled via the clutch ring of the disconnect). Next, at 802, an operator (i.e. driver) or other system may be send an input command to the controller or similar device. The input command may be a request to shift from the 4×4 mode to the 4×2 mode or vice versa. As such, the method at 802 may include receiving and reading the input command from the controller. Upon receiving the shift command, at 803 the method includes determining which shift mode has been commanded (i.e. requested) by the vehicle operator. If 4×2 operation is requested, then the process continues at 813 in FIG. 11. Alternatively, if 4×4 operation is requested, then the process continues at 804 in FIG. 10.

At 804, the method includes determining if the EMPD assembly 200 is in the 4×4 (second) position, that is, when clutch ring 230 along with the other components that translate axially with clutch ring 230 are in the 4×4 position, thereby the two rotating components together. At step 804 and the other steps of method 800 where it is determined whether the EMPD is in a certain position (e.g., 4×4, 4×2, or EOS), the controller may determine this based on an output of a position sensor (e.g., position sensor 208), as described above with reference to FIG. 9 and as described further below with reference to FIGS. 19 and 20. If the EMPD assembly 200 is already in the 4×4 position, then at 812 the method includes outputting a 4×4 feedback signal to the external vehicle controller to notify the operator and other system of the current 4×4 position. Alternatively, if at 804 the EMPD assembly 200 is not the 4×4 position, then at 805 an electrical current may be sent to energize coil 220. As previously explained, with energized coil 220 the clutch and latching ring assemblies may move in the positive axial direction. Next, at 806, the sensor 208 may detect if EMPD assembly 200 is at the EOS position defined by the pins of latching ring 260 coming into face-sharing contact with grooves 752 or 759. If the EMPD assembly 200 has not yet reached the EOS position, then at 807 a timer or other device may determine if the maximum allowable time has passed. As previously mentioned, the maximum allowable time for pulsing coil 220 may aid in reducing degradation of coil 220 and armature 225. If the maximum allowable time has not expired, then step 806 may be repeated to continually check if the EMPD assembly 200 has reached the EOS position. Conversely, if the maximum allowable time has expired, then at 808 current may stop flowing to coil 220, thereby de-energizing coil 220. Furthermore, a cooling period may be initiated to allow coil 220 to cool off before proceeding back to step 806.

At 806, once the EOS position has been reached, then at 809 coil 220 may be de-energized. Upon de-energizing coil 220, the clutch and latching ring assemblies move axially towards the 4×4 position and corresponding latching grooves. While this motion is occurring, at 810 the sensor 208 may monitor the position of the EMPD assembly 200. In one example, sensor 208 may continuously output a signal corresponding to the linear relationship of graph 900 of FIG. 9. At 811, the method includes determining if the EMPD assembly 200 is in the 4×4 position. If the 4×4 position has not yet been reached, then the process continues to 822 to determine of a threshold (e.g., maximum) number of shift attempts has been exceeded. If the threshold number of shift attempts has been exceeded, the process ends. Since method 800 may repeat continuously, the method may restart at 802 instead of 801 during a single drive cycle. If the threshold number of shift attempts has not been exceeded, the method loops back to 804 to determine if the EMPD is in the 4×4 position. Conversely at 811, if sensor 208 determines that EMPD assembly 200 is in the 4×4 position, then at 812 the method includes outputting a 4×4 feedback signal to the vehicle controller and/or vehicle operator, thereby ending method 800.

At 803, if 4×2 operation is requested, then method 800 proceeds in FIG. 11. Steps 813-823 of FIG. 11 may be similar to steps 804-812 of FIG. 10, while FIG. 11 focuses on shifting to the 4×2 position. As such, for the sake of brevity, brief descriptions of each of steps 813-821 will be presented while FIG. 10 may be referenced for more thorough descriptions. Referring to FIG. 11, at 813 the method includes determining if EMPD assembly 200 is in the 4×2 position. If the 4×2 position has been reached, then the method may end at 821 by outputting a 4×2 feedback signal to the vehicle controller. Alternatively, at 814 coil 220 may be energized if the EMPD assembly 200 is not the 4×2 position. At 815, if the EMPD 200 is not at the EOS position, then steps 816 and/or 817 may be initiated to allow EMPD 200 to reach the EOS position without overheating coil 220 by allowing cooling of the coil and adhering to the maximum allowable pulse time. Once the EMPD 200 is at the EOS position, then at 818 the coil 220 may be de-energized to allow the EMPD 200 to translate in the opposite, negative axial direction. The position of EMPD 200 may be monitored by sensor 208 at 819 until the method determines if EMPD 200 has reached the requested 4×2 position at 820. If EMPD 200 has not reached the 4×2 position, then several of the steps of FIG. 11 may be repeated after determining whether or not the threshold number of shift attempts has been reached at 823. Alternatively, if the 4×2 position has been reached, then at 821 the 4×2 feedback signal may be outputted to the vehicle controller, thereby ending method 800.

In this way, electromagnetic pulse disconnect assembly 200 may provide selective engagement between two rotating components while reducing electrical power consumption and not relying on vacuum as a power source. Since the latching mechanism including a latching ring, latch guide ring, and latch cam ring may hold disconnect 200 in the 4×4 and 4×2 positions, electrical current may only be provided when shifting between the 4×2 and 4×4 positions is required. Therefore, disconnect 200 may conserve power where other disconnect assemblies may be provided with a continuous current. Furthermore, the floating aspect of coil 220 (e.g., movable slightly in the axial direction) as described above may increase the durability and longevity of coil 220 and armature 2406 since coil return spring 2418 may maintain the air gap 657 when coil 220 is de-energized.

Turning now to FIGS. 12-16, embodiments of a center electromagnetic pulse disconnect 1802 positioned along a vehicle axle are shown. The center electromagnetic pulse disconnect 1802 may have similar components and function similarly to the electromagnetic pulse disconnect assembly described above with reference to FIGS. 2-11. The center electromagnetic pulse disconnect 1802 may selectively disconnect two portions of an axle (e.g., such as two portions of front axle 134 or rear axle 132 shown in FIG. 1).

Figure 12:
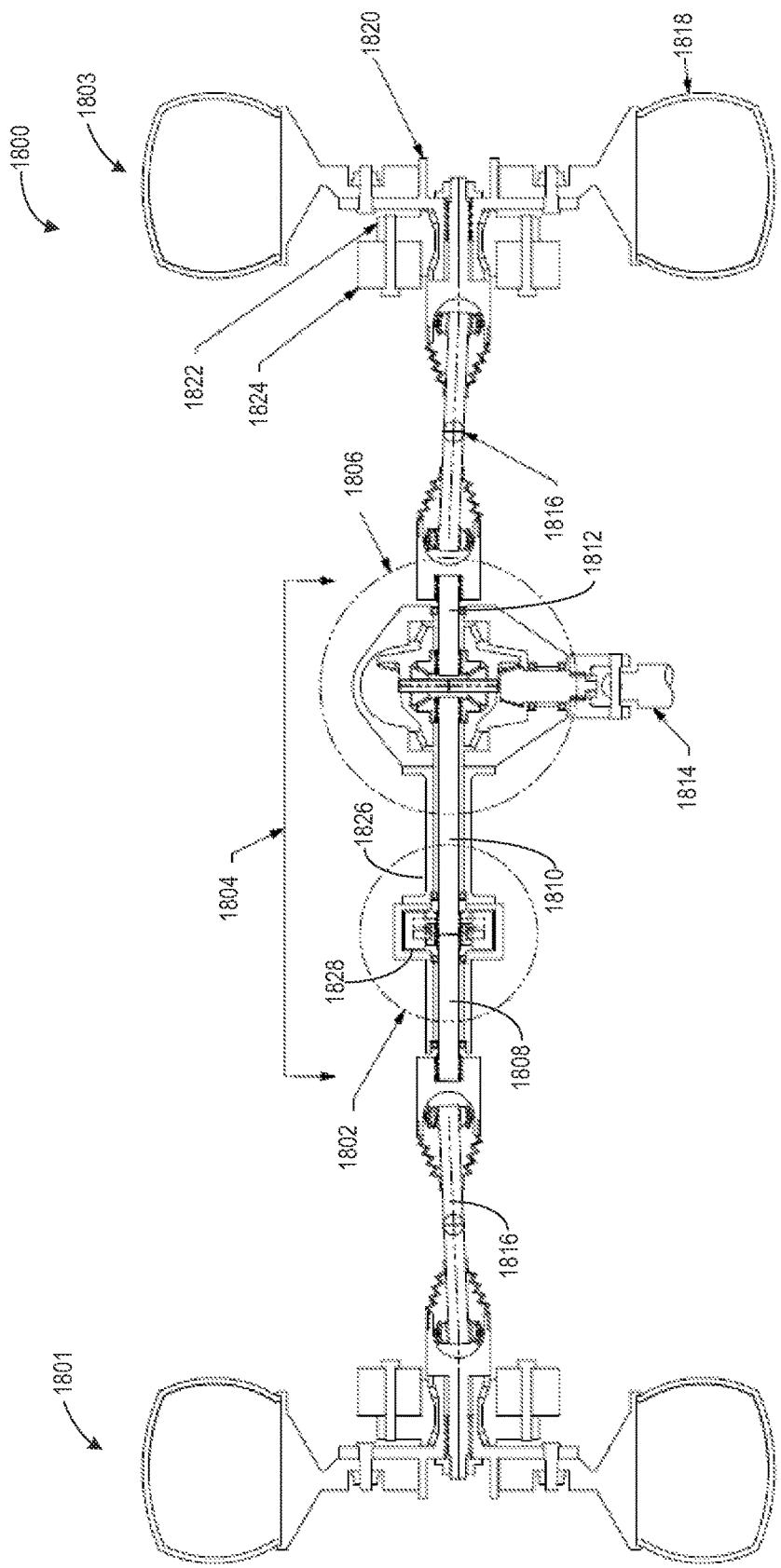
FIGS. 12-16 show different embodiments of a center electromagnetic pulse disconnect positioned along an axle of a vehicle.
Figure 15:
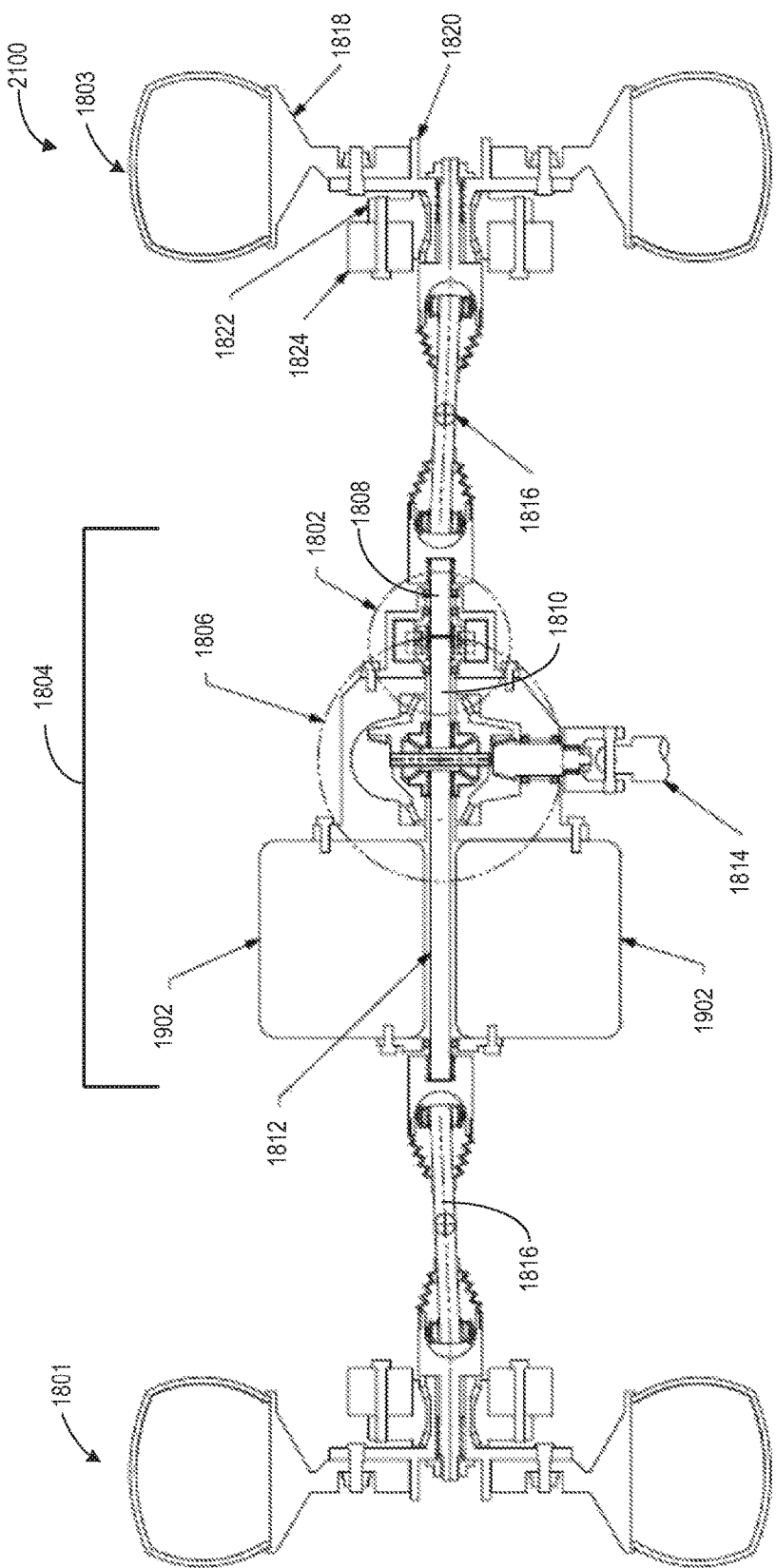

For example, FIG. 12 shows a schematic 1800 of a first embodiment of the center electromagnetic pulse disconnect 1802 positioned along an axle 1804 of a vehicle. For example, the axle 1804 may be a front axle or rear axle of the vehicle. As shown in FIG. 12, the center electromagnetic pulse disconnect 1802 is positioned in a mid-portion of the axle 1804 and away from the wheel and tire 1818 positioned on either end of the axle 1804. The axle 1804 may be coupled on either end of the axle 1804 to a half shaft 1816. Each half shaft 1816 is coupled to a wheel hub 1820 with a knuckle 1824 and wheel bearing 1822 surrounding the connecting shaft between the half shaft 1816 and wheel hub 1820. As shown in FIG. 12, the center electromagnetic pulse disconnect 1802 is positioned to one side of a differential 1806 (e.g., may be front differential 122 or rear differential 121 shown in FIG. 1). In alternate embodiments, the center electromagnetic pulse disconnect may be positioned on the opposite side of the differential 1806, as shown in FIG. 15, described further below.

The differential 1806 is directly coupled to a propeller shaft 1814. The propeller shaft 1814 may be part of or coupled to a front or rear drive shaft of the vehicle (e.g., such as front drive shaft 133 or rear drive shaft 131 shown in FIG. 1). As such, rotative power is translated from a vehicle drive shaft to the differential 1806. The differential 1806, arranged along the axle 1804, then distributes the torque to each of the wheels coupled to the axle 1804. The differential 1806 is coupled on a first side to a stub shaft 1812, the stub shaft 1812 part of the axle 1804 and directly coupled to one of the half shafts 1816. The differential 1806 is directly coupled on a second side, opposite the first side, to an intermediate shaft 1810 of the axle 1804.

The intermediate shaft 1810 is further coupled to the center electromagnetic pulse disconnect 1802. The center electromagnetic pulse disconnect 1802 is also coupled to a coupler shaft 1808, the coupler shaft 1808 directly coupled to another one of the half shafts 1816. As such, the center electromagnetic pulse disconnect may selectively disconnect two rotating components from one another, the two rotating components being the coupler shaft 1808, connected to a first wheel 1801, and the intermediate shaft 1810, coupled to the differential 1806 and thus the drive shaft of the vehicle through the propeller shaft 1814.

The center electromagnetic pulse disconnect 1802 consists of one disconnecting unit opposed to the two units of a hub lock system which has one assembly on each wheel. Since only one disconnecting unit is used, only one wheel (e.g., first wheel 1801) may be disconnected and the other wheel (e.g., second wheel 1803) may remain connected (e.g., to the drive portion of the axle 1804). For example, the center electromagnetic pulse disconnect 1802 shown in FIG. 12 may disconnect the first wheel 1801 from the drivetrain while the second wheel 1803 remains coupled to the drivetrain. The connected second wheel 1803, adjoining half shaft 1816, and stub shaft 1812 turn together, as do the disconnected coupler shaft 1808, adjoining half shaft 1816, and first wheel 1801. The intermediate shaft 1810 turns at the same speed as half shaft 1816 connected to wheel 1803 and stub shaft 1812, but in the opposite direction because of the differential bevel gears. Since the average speed of the intermediate shaft 1810 and stub shaft 1812 may be approximately zero, the differential carrier and propeller shaft 1814 remain motionless. The center electromagnetic pulse disconnect 1802 may offer benefits over a wheel end disconnect, such as reduced overall size, reduced cost, simplified implementation, and reduced shifting noise. Further, as shown in FIG. 12, the center electromagnetic pulse disconnect 1802 and the differential 1806 may be coupled to an axle housing 1826. The center electromagnetic pulse disconnect 1802 includes an actuator 1828 for selectively engaging and disengaging the coupled shaft 1808 and the intermediate shaft 1810, as described further below with reference to FIGS. 17-24.

Figure 13:
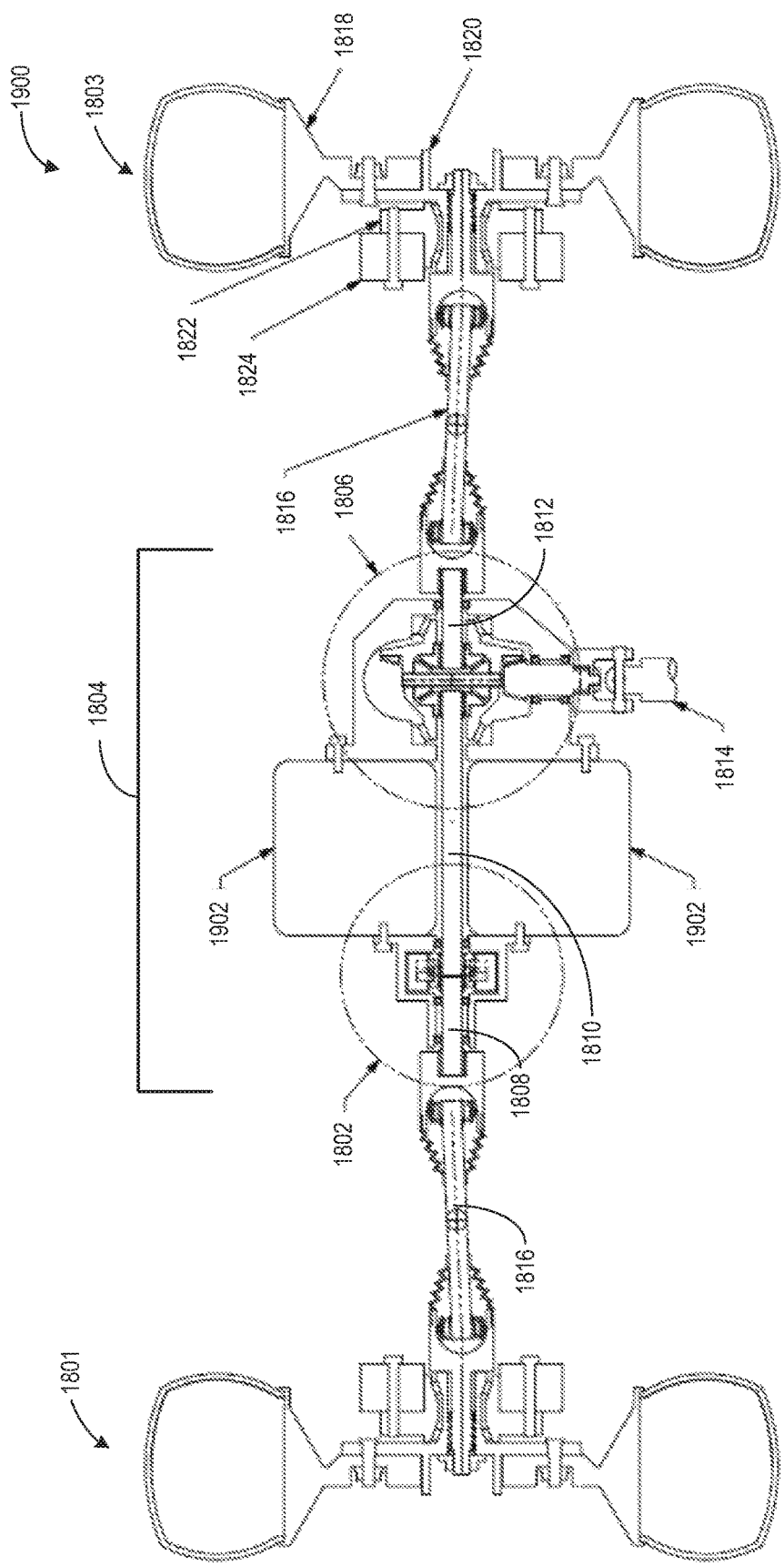

FIG. 13 shows a schematic 1900 a second embodiment of the center electromagnetic pulse disconnect 1802 positioned along the axle 1804 of a vehicle. As shown in FIG. 13, the axle 1804 (specifically, the intermediate shaft 1810 of the axle 1804) is positioned through an engine oil pan 1902. The center electromagnetic pulse disconnect 1802 is positioned on a first side of the engine oil pan 1902 while the differential 1812 is positioned on a second side of the engine oil pan 1902, the second side opposite the first side along a length of the axle 1804.

Figure 14:
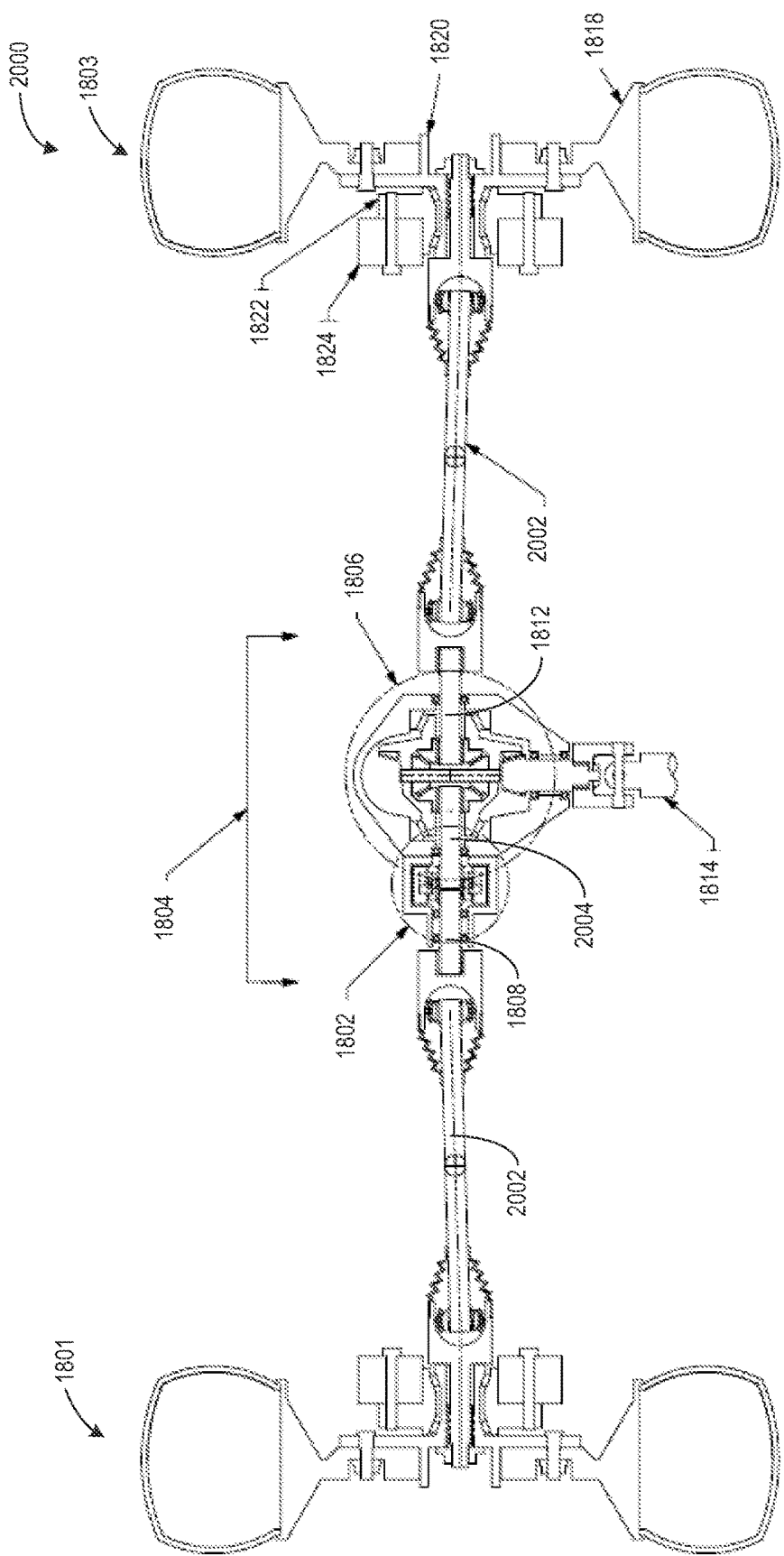

FIG. 14 shows a schematic 2000 of a third embodiment of the center electromagnetic pulse disconnect 1802 positioned along the axle 1804 of a vehicle. The third embodiment is similar to the first embodiment shown in FIG. 12. However, as shown in FIG. 14, the half shafts 2002 may be longer than the half shafts 1816 in FIG. 12. The center electromagnetic pulse disconnect 1802 is positioned closer to the differential 1806 along the intermediate shaft 2004. As such, the intermediate shaft 2004 of FIG. 14 is shorter than the intermediate shaft 1810 of FIG. 12. Further, the overall length of axle 1804 may be shorter in FIG. 14 than in FIG. 12. In this way, the center electromagnetic pulse disconnect 1802 and the differential 1806 may be positioned closer or farther away from one another along the axle 1804.

FIG. 15 shows a schematic 2100 of a fourth embodiment of the center electromagnetic pulse disconnect 1802 positioned along the axle 1804 of a vehicle. In the fourth embodiment, the engine oil pan 1902 is positioned on a first side of the differential 1806 with the stub shaft 1812 running through the engine oil pan 1902. The center electromagnetic pulse disconnect 1802 is positioned on a second side of the differential 1806 and may disconnect the second wheel 1803 from the drivetrain (instead of the first wheel 1801, as shown in the previous FIGS. 12-14).

Figure 16:
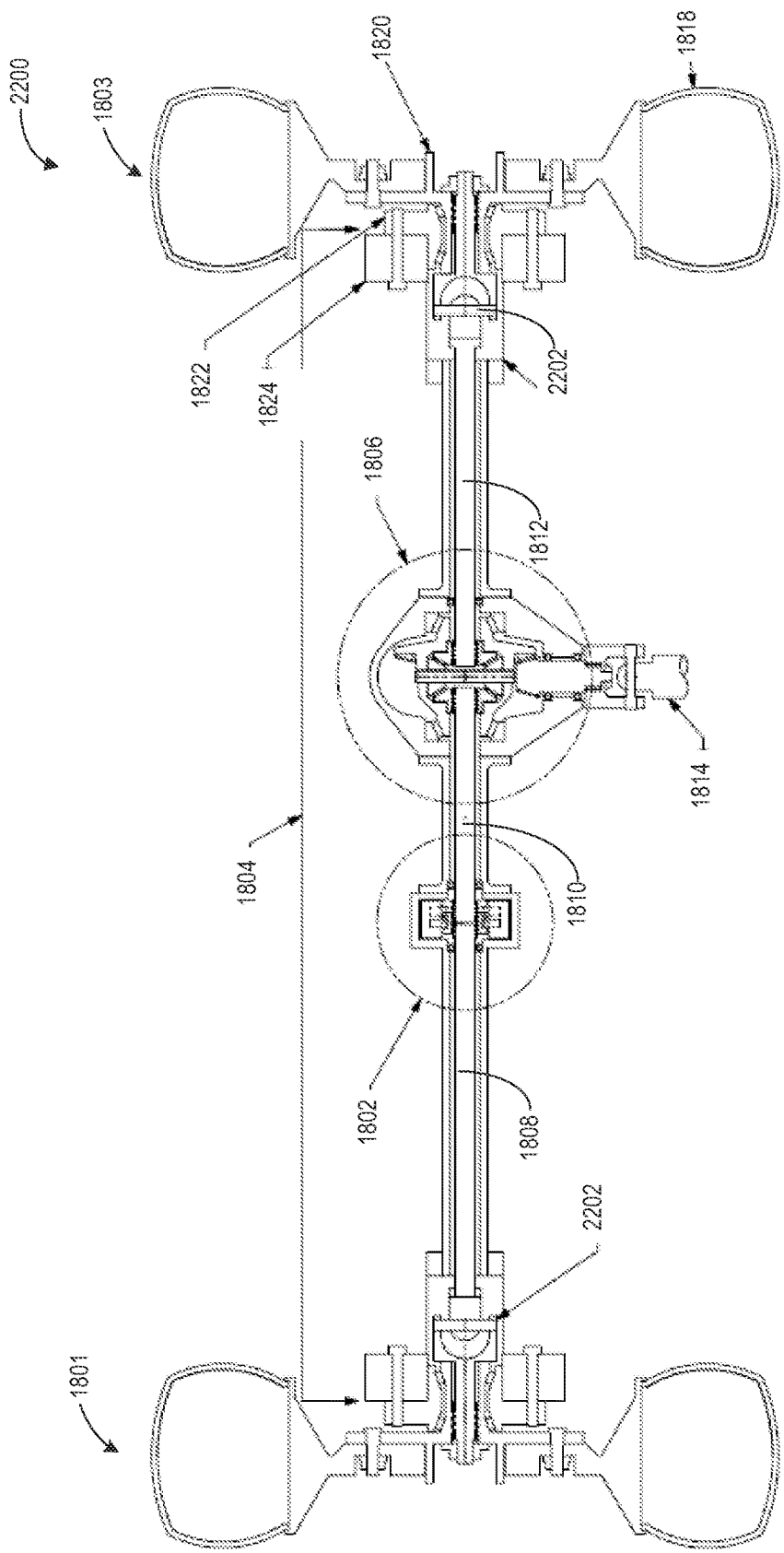

FIG. 16 shows a schematic 2200 of a fifth embodiment of the center electromagnetic pulse disconnect 1802 positioned along the axle 1804 of the vehicle. However, in FIG. 16, the axle 1804 is a monobeam axle coupled directly to a joint 2202 of the wheel hub 1820 and not to a half shaft. As such, the center electromagnetic pulse disconnect 1802 shown in FIG. 16 selectively disconnects the coupler shaft 1808 and intermediate shaft 1810 of the monobeam axle 1804.

Embodiments of a center electromagnetic pulse disconnect that may be positioned in one or more of the positions shown in FIGS. 13-16 are shown in greater detail in FIGS. 17-23. It should be noted that the center EMPD embodiments described below with reference to FIGS. 17-24 may be positioned in additional or alternative positions along a vehicle axle to those of FIGS. 13-16. FIGS. 17-24 may include similar components to those described above in reference to FIGS. 2-11. As such, similar components have been numbered similarly and may function as described above with reference to FIGS. 2-11. Thus, the center electromagnetic pulse disconnect may operate similarly to as described above with reference to FIGS. 2-11. In the interest of brevity, the common components between FIGS. 17-24 and FIGS. 2-11 may not be re-described completely below.

Figure 17:
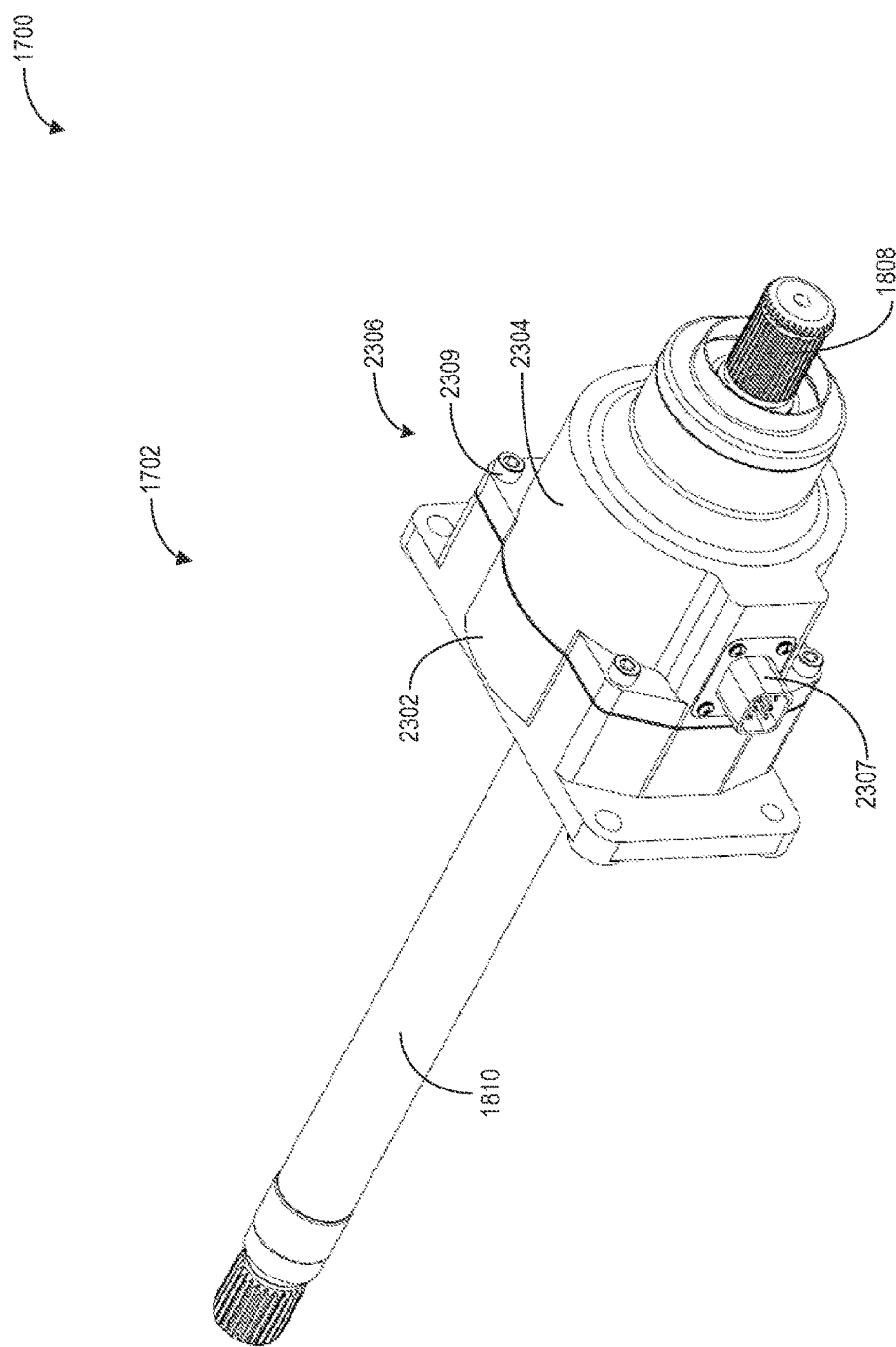
FIG. 17 shows an exterior view of a first embodiment of a center electromagnetic pulse disconnect adapted to be positioned along an axle of a vehicle.
Figure 18:
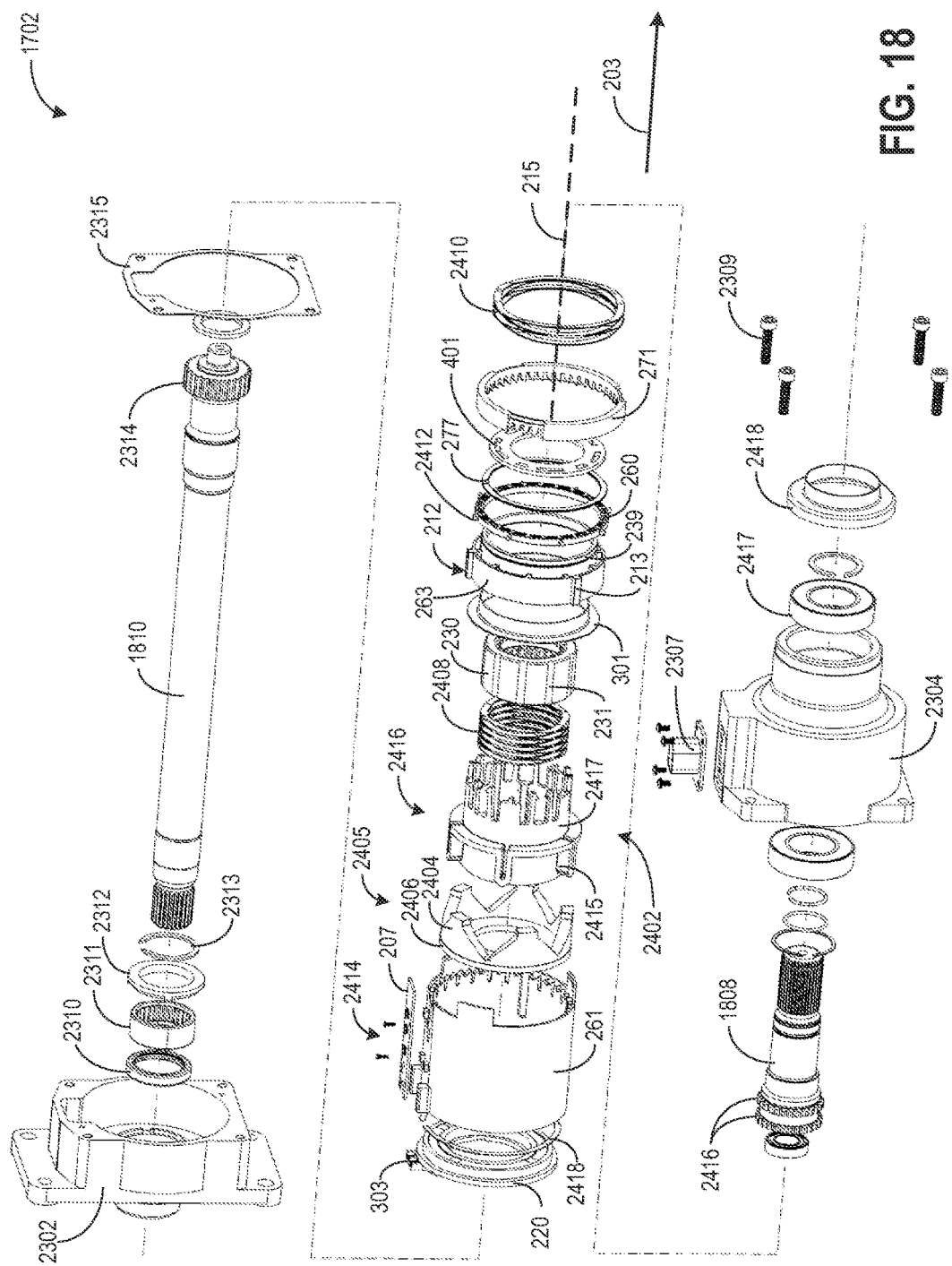
FIG. 18 shows an exploded view of a center electromagnetic pulse disconnect.

FIGS. 17-20 show a first embodiment of a center EMPD 1702. Specifically, FIG. 17 shows a schematic 1700 of an exterior view of the center EMPD 1702. FIG. 18 shows an exploded view of the center electromagnetic pulse disconnect 1702. FIG. 19 shows a cross-sectional view 1950 of the center electromagnetic pulse disconnect 1702, including an additional detail view 2420 of the position sensor assembly (e.g., including position sensor 208 and magnets 212). FIG. 20 shows a detail view of the position sensor assembly and clutch ring 230 relative to the coupler shaft 1808 and intermediate shaft 1810 for different shift positions of the EMPD 1702. Specifically, the 4×2 position is shown at 2020, the 4×4 position is shown at 2022, the end-of-shift (EOS) position is shown at 2024, and a block shift position is shown at 2024. The following description is made in reference to FIGS. 18, 19, and 20.

The center EMPD 1702 includes an outer housing 2306 including a base housing 2302 and cover housing 2304. The outer housing 2306 fully encloses (and entirely surrounds on all sides) the internal components of the center electromagnetic pulse disconnect 1702, as seen in FIG. 19. As such, external dirt and debris may not enter inside the outer housing 2306, thereby increasing the longevity, decreasing degradation, and improving the operation of the EMPD 1702. The base housing 2302 is coupled to the cover housing 2304 through a plurality of fasteners 2309. Additionally, the cover housing 2304 includes an electrical connection 2307 for connection the controller 2414 (as seen in FIG. 18) to an external source, such as a vehicle controller and/or power source. The center electromagnetic pulse disconnect 1702 further includes the intermediate shaft 1810 and the coupler shaft 1808, the center electromagnetic pulse disconnect selectively disconnecting the intermediate shaft 1810 and the coupler shaft 1808.

The clutch ring 230 is shifted between positions by cams rotated by the axle shaft. In this type of disconnect, there is no motor or force producing mechanism other than that provided by the axle shaft itself. Since the axles are always rotating as the vehicle moves down the road, selectivity of the rotating power is accomplished by providing a selectable force path to a non-moving vehicle structure that acts as a reaction member for the forces acting on the clutch ring 230. When the reaction member is present, the clutch ring 230 is moved between modes (e.g., 4×4 and 4×2). When the reaction is not present, the clutch ring 230 and shifting assembly 2402 rest at the last commanded position.

FIG. 18 shows a housing washer 2315 that is positioned between the base housing 2302 and cover housing 2304 when the EMPD 1702 is assembled. The intermediate shaft includes a gear portion 2314 including a plurality of teeth for engaging with complementary teeth of the clutch ring 230 (e.g., the row of teeth on the clutch ring 230 closes to the base housing 2302). FIG. 18 also shows a series of components seal 2310 (keeps contaminants out from the inboard side of the disconnect), needle bearing 2311 (supports the intermediate shaft 1810), thrust spacer 2312 (positions the intermediate shaft 1810 via retaining ring 2313) and armature 2406 axially in the inboard direction), and retaining ring 2313 (holds the intermediate shaft 1810 in the disconnect) positioned proximate to the base housing 2302 and intermediate shaft 1810. The coupler shaft 1808 includes a gear portion 2416 including a plurality of teeth that are adapted to be engaged with the clutch ring 230 when the EMPD is in the 4×4 position. The EMPD 1702 further includes a series of seals, sealed ball bearing 2417 and seal slinger 2418 (keeps large containments out from getting to the bearing) proximate to the cover housing 2304.

As previously described with reference to FIGS. 2-11, the shifting assembly 2402 consists of a cam 2404, armature 2406, clutch ring 230, shifter 2416, and block shift spring 2408. Part of the clutch ring 230 is arranged to have sliding teeth always engaged with the intermediate shaft 1810. Since the intermediate shaft 1810 turns through the differential bevel gears to the opposite side axle half shaft and wheel, the clutch ring 230 also turns. The other part of the clutch ring 230 is arranged to have sliding teeth which are engaged with the coupler shaft 1808 in one position (e.g., 4×4) and disengaged in another (e.g., 4×2). The shifter 2416 has high and low points (e.g., on guide portion 2415) and is connected to the clutch ring 230 with a cage portion 2417 that turns with it. As such, the shifter 2416 and clutch ring 230 rotate about the central axis 215 and translate back and forth along the axial direction 203 together as one unit. A cam 2404 is aligned with the guide portion 2415 of the shifter 2416 so that the guides of the shifter 2416 will track along the cam ramps of the cam 2404. Further, the armature 2406 is fixed to the cam 2404.

The armature cam assembly 2405 (armature 2406 and cam 2404) is in close proximity to the stationary electromagnetic coil 220 and separated by a small air gap. A coil return spring 2418 may also be included proximate to the coil 220. When the coil 220 is energized, the coil 220 is attracted to the metallic armature 2406 and touches after the air gap is closed. The contact friction developed from the electromagnetic force when the air gap is closed is sufficient to slow or stop the armature cam assembly 2405 from rotating. When armature cam assembly 2405 is rotating slower than the shifter 2416 is rotating, the cam ramps of the cam 2404 produce a force against the guides of the shifter 2416 which causes the shifter 2416 to move away from the cam 2404. This motion subsequently acts on the clutch ring 230 to produce a shift in the positive axial direction from the disengaged to the engaged position thereby shifting from the 4×2 position to the 4×4 position. The shifting process and corresponding interaction of the components of center EMPD 1720 functions the same as described above with regard to FIGS. 2-11.

The detail view 2420 of FIG. 19 shows the positioning of the position sensor 208 within the EMPD 1702. Specifically, the position sensor 208 is coupled to a bottom surface of the PCB 207. The position sensor 208 is further disposed directly above (with respect to a vertical direction, the vertical direction perpendicular to the axial direction and relative to a ground on which a vehicle in which the EMPD is installed sits) the latching ring housing 263. Said another way, relative to the central axis 215, the position sensor 208 is arranged radially outward from the latching ring housing 263. As previously described with reference to FIGS. 2-4, the latching ring housing 263 includes two magnets 212 (though other numbers of magnets are possible) arranged and embedded in a top surface of the latching ring housing 263, the top surface facing the position sensor 208 and PCB 207. The two magnets 212 are spaced a distance apart, on opposite sides of a top lug 213 of the latching ring housing 263. As shown in detail view 2420, the two magnets 212 are arranged so that a first of the two magnets has its north pole facing outward toward the position sensor 208 and its south pole embedded within the lug 213 and a second of the two magnets has its south pole facing outward toward the position sensor 208 and its north pole embedded within the lug 213. The axial position of the two magnets 212 relative to the stationary sensor 208 (e.g., the PCB 207 is stationary and does not translate in the axial direction) then determines the magnetic field strength measured by the sensor, thereby changing the sensor output and allowing the controller to determine the shift position of the EMPD 1702.

As previously described, when the field strength is equal to a predetermined first value, the shifting assembly 2402 is in the 4×4 position. When the field is a second value, lower than the first value, the shifting assembly 2402 is in the 4×2 position. The position, therefore, is fed back to the controller 2414. The controller 2414 can then energize the coil 220 as required to make a shift to the commanded mode. It should be appreciated that the sensor 208 and magnets 212 comprise a switching system and could be replaced with other types of switching systems such as a snap switch and actuation points, a contact wiper which follows an encoder, or optical switching.

FIG. 20 shows the relative positioning of the position sensor 208 and the magnets 212 in the different shift positions. The magnets 212 include a first magnet 2011 that is closer, in the axial direction, to the coil 220 than a second magnet 2012. Said another way, the second magnet 2012 of the magnet 212 is closer to the return spring 2410 than the first magnet 2011. View 2020 shows the EMPD 1702 in the 4×2 position wherein the clutch ring 230 is only coupled to the intermediate shaft 1810 and not the coupler shaft 1808. The second magnet 2012 is positioned proximate to (e.g., almost directly below and lined up with) the position sensor 208. As such, the position sensor 208 is closer to the second magnet than the first magnet 2011. As such, the position sensor 208 outputs a first signal that is indicative of the EMPD being positioned in the 4×2 position.

View 2022 shows the EMPD 1702 in the 4×4 position wherein the clutch ring 230 is coupled to both the intermediate shaft 1810 and the coupler shaft 1808. In this position, the latching ring housing 263 is pushed further in the positive axial direction than when in the 4×2 position. The position sensor 208 is positioned almost equidistant between the first magnet 2011 and second magnet 2012. As such, the position sensor 208 may sense both magnets 212 and output a second signal that is indicative of the EMPD being position in the 4×4 position. As described above with reference to FIG. 9, the second signal may be higher voltage percentage than the first signal.

View 2024 shows the EMPD 1702 in the EOS position wherein the clutch ring is still coupled to both the intermediate shaft 1810 and the coupler shaft 1808. However, in this position, the latching ring housing 263 is pushed even further in the positive axial direction so that the first magnet 2011 is almost in direct vertical alignment with the position sensor 208. Said another way, the first magnet 2011 is the closest it may be to the position sensor 208 while the second magnet is the furthest it may be from the position sensor 208. As such, the position sensor outputs a third signal that is indicative of the EMPD being in the EOS position. As described above with reference to FIG. 9, the third signal may be a higher voltage percentage than the second signal.

View 2026 shows the EMPD 1702 in a block shift position wherein the clutch ring 230 is not able to shift due to the clutch teeth being miss-aligned or binding. As such, the block shift spring 2408 deflects and allows the shifter assembly to complete the commanded motion. When the teeth are aligned or when the binding is removed, the spring will force the clutch ring into the desired position. In this position, the first magnet 2011 and second magnet 2012 are almost equidistant, in the axial direction, from the position sensor 208. In this position, as shown in view 2026, the shifter assembly has completed its commanded motion and is at rest in the 4×4 position. Once the clutch ring and coupler shaft splines aligned, the shift spring 2408 will engage the clutch ring and transfer torque to the wheels.

In addition to the normal operation, the controller 2414 may be configured to detect various types of faults and to take corrective measures. The shifting assembly 2402 not moving in an expected period of time, for example, may be detected as a fault. The condition may be corrected by various means including repeating a coil pulse until the commanded mode is achieved.

A further arrangement of the controller 2414 may include other sensor types including but not limited to axle speed sensors. The information from these sensors may be used to further refine the shifting algorithm under certain vehicles circumstances like disallowing a mode shift when the vehicle is stopped or travelling at high speeds.

Figures 21, 22:
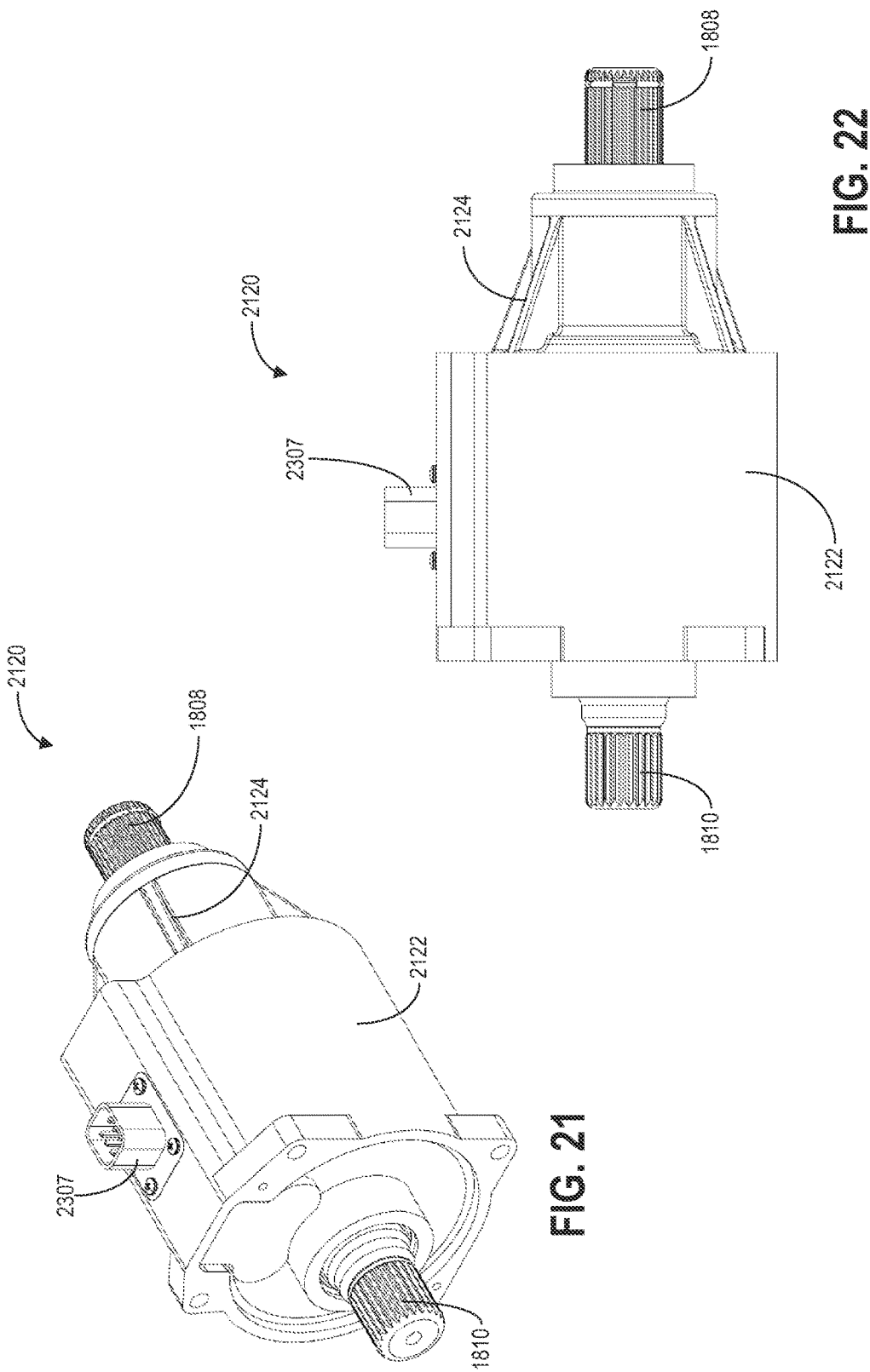
FIGS. 21-23 show a second embodiment of a center electromagnetic pulse disconnect having a single continuous housing.
Figure 23:
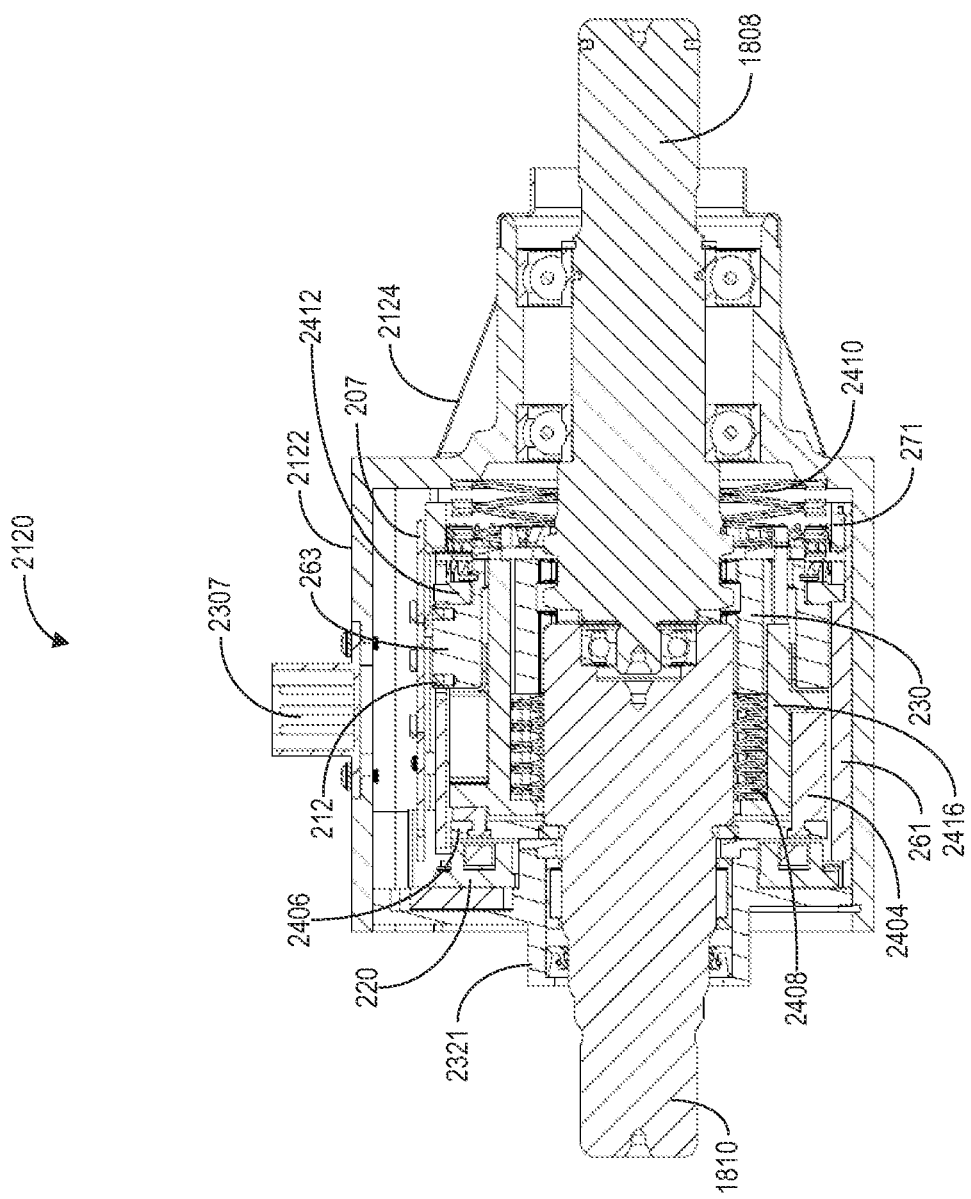

FIGS. 21-23 shows a second embodiment of a center EMPD 2120 that includes only one housing (e.g., one integrated and continuous housing that is formed as a single part) but may be integrated with a stub axle. FIG. 21 shows an isometric external view of the EMPD 2120, FIG. 22 shows a side external view of the EMPD 2120, and FIG. 22 shows a cross-sectional internal view of the EMPD 2120. The EMPD 2120 contains the same internal components as shown in FIGS. 18-20. As such, components have been numbered similarly and will not be re-described. Further, not all components have been numbered as they are the same as shown in FIGS. 18-20.

As shown in FIGS. 21 and 22, the EMPD 2120 includes a single, continuous housing 2122 that completely encases and surrounds the internal components of the EMPD 2120 (such as the components shown in FIGS. 18 and 19). The housing 2122 additionally includes ramped flanges 2124 positioned proximate to the coupler shaft 1808. The ramped flanges 2124 extend around a circumference of the portion of the housing 2122 surrounding the coupler shaft 1808. Additionally, flanges 2124 extend outwardly from the housing 2122 and between the narrower portion of the housing 2122 surrounding the coupler shaft 1808 and the wider portion of the housing 2122 surrounding the intermediate shaft 1810. As shown in FIG. 23, in addition to the components described above with reference to FIGS. 2-8 and 18-20, the EMPD 2120 includes a coupling flange 2321 that holds the internal components of the EMPD 2120 in place while also providing an interface for coupling the EMPD 2120 to a vehicle. In alternate embodiments, the housing 2122 may not include flanges 2124.

Figure 24:
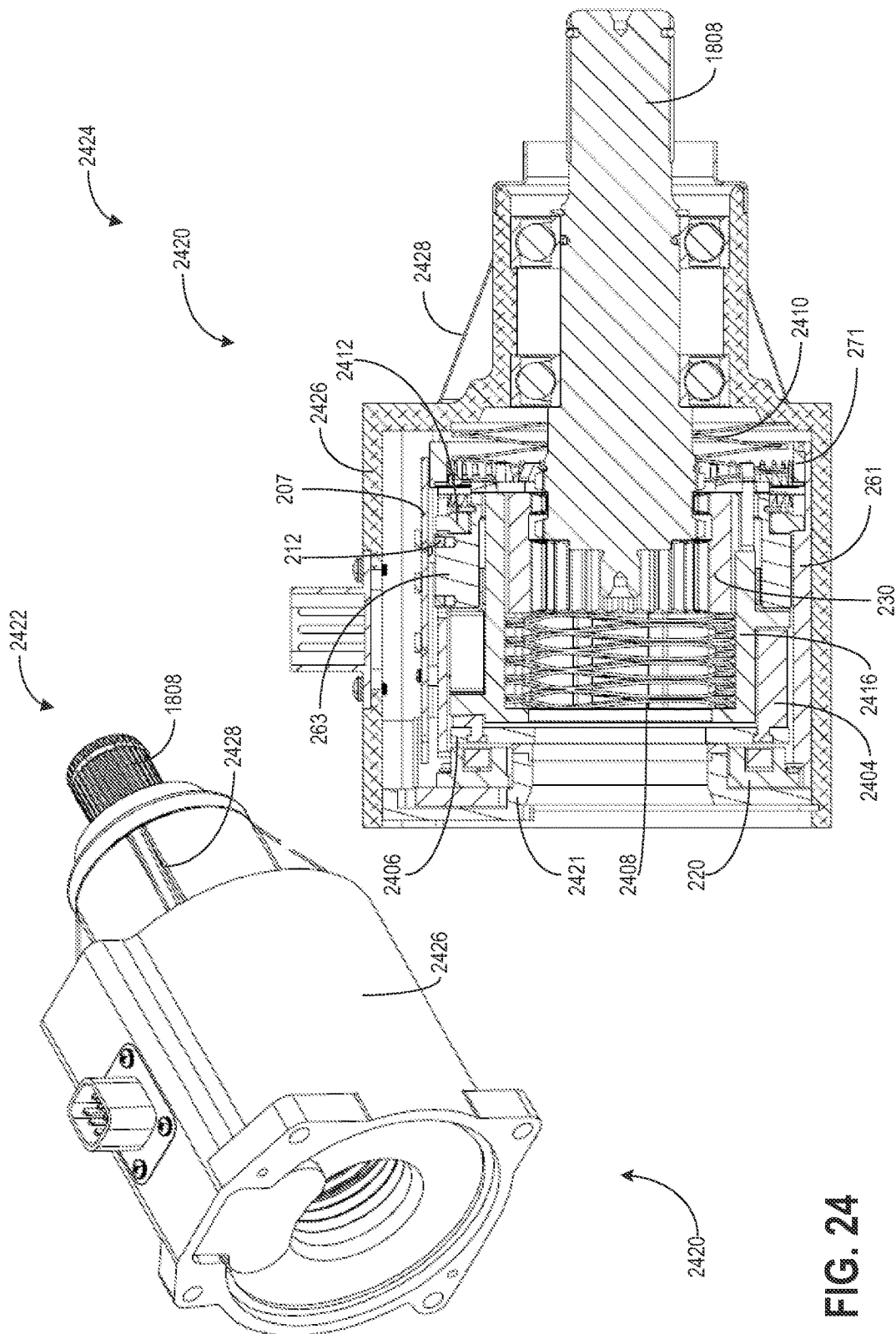
FIG. 24 shows a third embodiment of a center electromagnetic pulse disconnect having a single continuous housing.

FIG. 24 shows a third embodiment of a center EMPD 2420 that includes only one housing (e.g., one integrated and continuous housing that is formed as a single part). Schematic 2422 shows an isometric external view of the EMPD 2420 and schematic 2424 shows a cross-sectional internal view of the EMPD 2420. The EMPD 2420 contains the same internal components as shown in FIGS. 18-20. As such, components have been numbered similarly and will not be redescribed. Further, not all components have been numbered as they are the same as shown in FIGS. 18-20.

As shown in FIG. 24, the EMPD 2420 includes a single, continuous housing 2426 that completely encases and surrounds the internal components of the EMPD 2420 (such as the components shown in FIGS. 18 and 19). The housing 2426 additionally includes ramped flanges 2428 positioned proximate to the coupler shaft 1808. The ramped flanges 2428 extend around a circumference of the portion of the housing 2426 surrounding the coupler shaft 1808. Additionally, flanges 2428 extend outwardly from the housing 2426 and between the narrower portion of the housing 2426 surrounding the coupler shaft 1808 and the wider portion of the housing 2426 surrounding the larger diameter internal components of the EMPD 2420. As shown in schematic 2424, in addition to the components described above with reference to FIGS. 2-8 and 18-20, the EMPD 2420 includes a coupling flange 2421 that holds the internal components of the EMPD 2420 in place while also providing an interface for coupling the EMPD 2420 to a vehicle. Both housings 2120 and 2422, as described above with reference to FIGS. 21-23 and FIG. 24, respectively include one side that is open and not sealed. As such, a housing part is eliminated and the disconnect may bolt to and seal against the side of a power train component such as a differential or an oil pan.

Additional components not described herein may be included in the center electromagnetic pulse disconnects of FIGS. 17-24. Further, additional components shown in FIGS. 2-8 may be included in the center electromagnetic pulse disconnects of FIGS. 17-24. Further, components of the center electromagnetic pulse disconnect described above with reference to FIGS. 17-24 may also be included in the embodiments show in FIGS. 2-8.

As one embodiment, a method of operating a disconnect assembly of a shaft, comprises: driving a shifter mechanism from a first self-locking position to a second self-locking position via an electromagnetic coil generating an axial force through an armature cam assembly including a series of bi-directional ramps interfacing with axially extending guides of the shifter mechanism, the coil energized only during transitions between the first and second self-locking positions, the first and second self-locking positions including a shaft engaging position and a shaft disengaging position. As one example, a clutch ring including a plurality of teeth for selectively engaging the shaft is coupled to the shifter mechanism and driving the shifter mechanism includes translating the clutch ring and a latching ring positioned adjacent to the shifter mechanism axially together, in a direction of a central axis of the disconnect assembly, between the first and second self-locking positions while the clutch ring and latching ring rotate independent of each other. Further, the shifter mechanism stays in the first and second self-locking positions without activation of the electromagnetic coil. The method further comprises rotating the armature cam assembly along with the shifter mechanism when the electromagnetic coil is de-activated and the disconnect assembly is in the first self-locking position. In another example, the method further comprises activating and then deactivating the coil to transition the shifter mechanism from the first self-locking position to the second self-locking position and activating and deactivating the coil to transition the shifter mechanism from the second self-locking position to the first self-locking position. In yet another example, the method further comprises maintaining the shifter mechanism in the first self-locking position or the second self-locking position when the coil is deactivated, even when transmitting and not transmitting torque and rotation of the shaft through the assembly. As one example, engagement and disengagement of the shaft is assisted via rotary motion of the shaft and wherein the electromagnetic coil is counteracted by a mechanical biasing force.

As another embodiment, an electromagnetic pulse disconnect assembly, comprises: an electromagnetic coil selectively energized by a pulsing electrical current; a shifting assembly including a metallic armature fixed to a cam including a series of bi-directional ramps, a shifter including a plurality of axially extending guides interfacing with the cam between each of the series of bi-directional ramps, and a clutch ring coupled to the shifter; and a latching ring assembly including a latching track profile including first and second self-locking positions. As one example, the shifter and clutch ring translate in an axial direction, with respect to a central axis of the electromagnetic pulse disconnect assembly, and rotate around the central axis as a unit. As another example, the latching ring assembly further comprises a latching ring including a plurality of pins arranged around an outer circumference of the latching ring and a latching ring housing including a stepped recess for holding the latching ring, wherein the latching ring housing and latching ring are translatable in the axial direction along with the shifter. As a further example, the latching ring housing is rotatably fixed and the latching ring housing includes embedded magnets that create a detectable magnetic field separate from a localized magnetic field created by the electromagnetic coil. In one example, the electromagnetic pulse disconnect assembly further comprises a stationary magnetic position sensor configured to detect the magnetic field of the magnets for determining a shift position of the electromagnetic pulse disconnect assembly. As another example, the latching ring assembly further comprises a latch cam ring including a first series of teeth forming a first track surface and latch guide ring including a second series of teeth, offset from the first set, forming a second track surface, the first track surface and second track surface forming the latching track profile. Additionally, the plurality of pins are positioned in the latching track profile between the first track surface and second track surface, the latch cam ring and latch guide ring are stationary, and the latching ring is rotatable around and translatable along the central axis. In another example, the latch cam ring circumferentially surrounds the shifting assembly and wherein the first track surface further comprises multiple grooves shaped to contact and hold the plurality of pins of the latching ring in the first self-locking position and second self-locking position. Further, the armature is magnetically attracted to the electromagnetic coil when the electromagnetic coil is energized and the electromagnetic coil includes one or more springs for maintaining an air gap between the electromagnetic coil and armature when the coil is de-energized. In another example, the electromagnetic pulse disconnect system further comprises an outer housing arranged along a mid-portion of an axle of a vehicle, the outer housing entirely encasing the electromagnetic coil, the shifting assembly, and the latching ring assembly and the clutch ring selectively engages a coupler shaft and intermediate shaft of the axle.

As yet another embodiment, a method for selectively engaging two rotating components with a disconnect assembly, comprises: during a first mode, holding a clutch ring in a first position via pins of a latching ring contacting first grooves in a latch cam ring, the latching ring translatable with the clutch ring along a central axis of the disconnect assembly; upon receiving a command to shift to a second mode, energizing an electromagnetic coil to magnetically attract an armature fixed to a cam and translate a shifter fixed to the clutch ring to an end-of-shift position, whereupon the coil is de-energized and a spring pushes the clutch ring to a second position where the pins contact second grooves in the latch cam ring to hold the clutch ring in the second position; and upon receiving a command to shift to the first mode, energizing the electromagnetic coil to translate the clutch ring to the end-of-shift position, whereupon the coil is de-energized and the spring pushes the clutch ring to the first position where the pins contact the first grooves to hold the clutch ring in the first position. As one example, the shifter and clutch ring translate to the end-of-shift position, sliding the pins along a latching track profile and against a first track surface of a latching guide ring to rotate the latching ring and bring the pins into contact with end-of-shift grooves in the latch guide ring, where a second track surface of the latch cam ring and first track surface of the latch guide ring form the latching track profile. As another example, the method further comprises upon de-energizing the electromagnetic coil, sliding the pins along the latching track profile and against the second track surface of the latching cam ring to rotate the latching ring and bring the pins into contact with one of the first grooves or second grooves. Further, the first mode is a two-wheel drive mode wherein the clutch ring is coupled to only one of the two rotating components and the second mode is a four-wheel drive mode wherein the clutch ring is coupled to both of the two rotating components. As yet another example, the method further comprises receiving the commands to shift to the first and second modes at a disconnect controller of the disconnect assembly from a vehicle controller. In another example, the method further comprises detecting the first, second, and end-of-shift positions of the clutch ring and any position of the clutch ring in between or beyond the first, second, and end-of-shift positions with a position sensor in electronic communication with the disconnect controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for selectively engaging two rotating components with a disconnect assembly, comprising:
   during a first mode, holding a clutch ring in a first position via pins of a latching ring contacting first grooves in a latch cam ring, the latching ring translatable with the clutch ring along a central axis of the disconnect assembly;
   upon receiving a command to shift to a second mode, energizing an electromagnetic coil to magnetically attract an armature fixed to a cam and translate a shifter fixed to the clutch ring to an end-of-shift position, whereupon the coil is de-energized and a spring pushes the clutch ring to a second position where the pins contact second grooves in the latch cam ring to hold the clutch ring in the second position; and
   upon receiving a command to shift to the first mode, energizing the electromagnetic coil to translate the clutch ring to the end-of-shift position, whereupon the coil is de-energized and the spring pushes the clutch ring to the first position where the pins contact the first grooves to hold the clutch ring in the first position.

2. The method of claim 1, wherein while the shifter and clutch ring translate to the end-of-shift position, sliding the pins along a latching track profile and against a first track surface of a latching guide ring to rotate the latching ring and bring the pins into contact with end-of-shift grooves in the latching guide ring, wherein a second track surface of the latch cam ring and the first track surface of the latching guide ring form the latching track profile.

3. The method of claim 2, further comprising, upon de-energizing the electromagnetic coil, sliding the pins along the latching track profile and against the second track surface of the latch cam ring to rotate the latching ring and bring the pins into contact with one of the first grooves or second grooves.

4. The method of claim 1, wherein the first mode is a two-wheel drive mode wherein the clutch ring is coupled to only one of the two rotating components and the second mode is a four-wheel drive mode wherein the clutch ring is coupled to both of the two rotating components.

5. The method of claim 1, further comprising receiving the commands to shift to the first and second modes at a disconnect controller of the disconnect assembly from a vehicle controller.

6. The method of claim 5, further comprising detecting the first, second, and end-of-shift positions of the clutch ring and any position of the clutch ring in between or beyond the first, second, and end-of-shift positions with a position sensor in electronic communication with the disconnect controller.

\* \* \* \* \*